United States Patent
Yoshida

(10) Patent No.: US 6,169,753 B1
(45) Date of Patent: Jan. 2, 2001

(54) TRANSMISSION DEVICE AND SIGNAL TRANSMISSION METHOD IN SYNCHRONOUS NETWORK

(75) Inventor: Hiroshi Yoshida, Kawasaki (JP)

(73) Assignee: Fujitsu Limited, Kawasaki (JP)

( * ) Notice: Under 35 U.S.C. 154(b), the term of this patent shall be extended for 0 days.

(21) Appl. No.: 09/044,435

(22) Filed: Mar. 19, 1998

(30) Foreign Application Priority Data

Oct. 14, 1997 (JP) .................................................. 9-280923

(51) Int. Cl.[7] ....................................................... H04J 3/06
(52) U.S. Cl. ........................................... 370/507; 375/358
(58) Field of Search ........................... 370/503, 507–509, 370/512; 375/354, 356, 357, 358, 359

(56) References Cited

U.S. PATENT DOCUMENTS

| | | | |
|---|---|---|---|
| 3,967,058 | * 6/1976 | Moriya et al. ...................... | 370/507 |
| 4,860,285 | * 8/1989 | Miller et al. ......................... | 370/507 |
| 4,965,811 | * 10/1990 | Sparks .................................. | 370/507 |
| 5,204,882 | * 4/1993 | Chao et al. .......................... | 370/507 |
| 5,394,437 | * 2/1995 | Ayanolu et al. ..................... | 370/507 |
| 5,475,717 | * 12/1995 | Cordoniier et al. ................ | 375/356 |
| 5,602,992 | * 2/1997 | Daneels ............................... | 370/507 |

FOREIGN PATENT DOCUMENTS

| | | |
|---|---|---|
| 53-089602 | 8/1978 | (JP) . |
| 63-073754 | 4/1988 | (JP) . |
| 5091119 | 4/1993 | (JP) . |

* cited by examiner

*Primary Examiner*—Ricky Ngo
(74) *Attorney, Agent, or Firm*—Helfgott & Karas, PC.

(57) ABSTRACT

This invention discloses a transmission device used as a node device for a trunk network and a signal transmission method in a synchronous network. The transmission device comprises a clock extracting unit for extracting a plurality of clock signals from received signals, a selecting unit for selecting a clock signal for transmitting a transmission signal, a relay-transmitting unit for relay-transmitting the transmission signal by using the selected clock signal, an identification information notifying unit for notifying a receiving side of identification information regarding the clock supply system of the selected clock signal, a relay-receiving unit for relay-receiving the transmission signal, an identification information extracting and recognizing unit for extracting and recognizing identification information regarding a clock signal contained in the relay-transmitted transmission signal and an inhibition setting unit for inhibiting the selecting unit to select, as a clock signal contained in a transmission signal to be relay-transmitted, a clock signal contained in the previously relay-transmitted transmission signal based on the result of recognizing the identification information. Thus, a clock system closed loop can be prevented from being formed even among three or more transmission devices.

7 Claims, 18 Drawing Sheets

FIG. 5(a)

|  | SPECIFIC NAME |
|---|---|
| D4#2 | 1st CHARACTER |
| D4#3 | 2nd CHARACTER |
| D7#2 | 3rd CHARACTER |
| D7#3 | 4th CHARACTER |
| D10#2 | 5th CHARACTER |
| D10#3 | 6th CHARACTER |
| S1#2 | 7th CHARACTER |
| S1#3 | 8th CHARACTER |

FIG. 5(b)

| M1#2 | RELAYING NUMBER |
|---|---|
| 00000000 | UNUSED |
| 00000001 | 1 |
| 00000010 | 2 |
| . . | . . |
| 00010100 | 20 |
| OVER | UNUSED |

TRANSMISSION DEVICE AND SIGNAL TRANSMISSION METHOD IN SYNCHRONOUS NETWORK

BACKGROUND OF THE INVENTION (1) Field of the Invention

This invention relates to a transmission device which is suitably used, for instance as a node device for a trunk network, and c signal transmission method in a synchronous network.

(2) Description of the Related Art

With the standardization of a synchronous digital hierarchy technology (abbreviated as SDH, hereinafter) in recent years, efforts have been made to introduce an SDH network in various countries.

Referring to FIG. 15 which is a block diagram, there is shown an example of an SDH network paying particular attention to its clock supply system. An SDH network 100 shown in FIG. 15 includes a plurality of network elements (abbreviated as NE, hereinafter) 102 and a plurality of slaves 103, which are connected in series to a PRC 101 as a clock oscillator.

Specifically, a plurality of NEs 102 (e.g., N elements; N is 20 at the maximum) and one slave 103 are alternately connected in series to the PRC 101. For the number of slaves 103 among the plurality of NEs 102, K slaves (K is 10 at the maximum) are provided.

The PRC 101 is a high-quality clock oscillator, which is prepared on the SDH network 100 as prescribed by Recommendation G.811 of International Telecommunication Union (abbreviated as ITU).

A clock produced from the PRC 101 is used as a master clock and supplied via each NE 102 so as to be distributed to all the NEs 102 included in the SDH network 100. Accordingly, synchronism can be obtained for the entire SDH network 100.

The quality of a synchronizing clock is reduced each time it is relayed through the NE 102. Thus, according to Recommendation of ITU or the like, the number of NEs relaying a clock signal (number of relaying) must be maintained at a fixed number. As prescribed by Recommendation G. 812, the slave 103 is provided so as to regain the clock quality when it is necessary to perform clock relaying by a number of times exceeding the above-noted fixed number.

For distributing a clock from the PRC 101, for example as shown in FIG. 16, a STM-N signal for main signal transmission, a signal (2 Mb/s) for clock distribution or a signal (1.544 Mb/s) for hierarchy formation is used. In other words, by using a clock signal component contained in each of these signals, a master clock can be transmitted from the PRC 101 to NEs 102a and 102b.

Upon receiving such a signal, according to setting, each of the NEs 102a and 102b selects one of the clock signals of several kinds of input signals based on a preset priority order. The selected clock signal is used as an internal operation clock 104.

Specifically, in the NE 102a, among signals (STM-1 signal 121, STM-1 signal 122 and clock distribution signal [EXT CLOCK; EXTERNAL CLOCK] 123) containing clock signal components inputted from other NE (e.g., NE 102b), a priority order can be set beforehand for clock signals to be selected.

In the NE 102a shown in FIG. 16, the STM-1 signal 122 is first in the priority order, the STM-1 signal 121 is second and the clock distribution signal [EXT CLOCK; EXTERNAL CLOCK] 123 is third.

For clock selection, in each NE, a better quality clock is selected based on a synchronous status message half byte (abbreviated as SSMB) as clock quality information added to an input signal. In FIG. 16, "G. 811" indicating that a clock is from the PRC 101 or later-described "DNU" is set as an SSMB.

For example, an SSMB as a quality signal byte is taken out for the section overhead (abbreviated as SOH) of the STM-N signal. Then, for instance, the NE 102a automatically selects a clock to be selected from input signals (STM-1 signal 121, 122 or clock distribution signal 123) which can be selected as clocks according to the set clock selection priority order and the SSMB of each input signal.

Quality information regarding the selected clock is multiplexed to be an output signal and then outputted.

Accordingly, for instance when a clock signal contained in the STM-N signal is selected, in each of the NEs 102a and 102b, clock quality information is taken out from the quality signal byte contained in the SOH of the STM-N signal. Then, if the currently selected clock signal becomes defective for one reason or another, this clock signal is changed to another better quality clock signal in the choices. Thus, a redundant configuration may result.

In the clock distribution system, a clock system closed loop 124 like that shown in FIG. 16 may be formed because of the redundant configuration or the complex structure of the network or setting mistakes, and so on, made by a maintenance engineer.

Because of the formation of this closed loop 124, a distribution system cannot be correctly configured between the two opposing NEs 102a and 102b, and the distribution system is disconnected. Consequently, a master clock cannot be supplied. In other words, a clock distributed from the master clock cannot be selected in the NEs 102a and 102b having the closed loop 124.

It is difficult for the maintenance engineer to identify such a clock closed loop 124. In addition, since the NEs 102a and 102b use clocks received from each other as master clocks, a difference between these clocks will be increased if fluctuation occurs in a clock frequency contained in a signal following the deterioration of a transmission line caused by environmental changes such as temperature fluctuation. Consequently, a main signal system will be adversely affected. For instance, jitters or the like may occur.

In order to deal with the above-described situation, for example as shown in FIG. 17, clock quality indicated in the STM-1 signal outputted from the NE 102b to a clock receiving direction (direction from the NE 102b to the NE 102a) is forcibly displayed as Don't use (DNU; clock signal use not allowed). In this way, this clock cannot be used in the opposite NE 102a. The formation of a closed loop in the clock system between the opposing NEs can be prevented.

As described above, in the NEs each as a transmission device like that shown in FIG. 17, the formation of a clock closed loop can be prevented between the opposing NEs 102a and 102b. However, the formation of a clock system closed loop cannot be prevented if three or more NEs are used.

For example as shown in FIG. 18, in the case of an SDH network 100' configured by interconnecting three NEs 102a to 102c, if the supply system of a master clock supplied to the NE 102a is disconnected, a clock system closed loop 125 of NE 102a→NE 102b→NE 102c→NE 102a may be formed.

That is, as shown in FIG. 17, between the opposing NEs 102a and 102b, for example only a clock selected to be distributed from the NE 102b to the NE 102a cannot be selected when a signal of a direction from the NE 102a to the NE 102b is to be transmitted. Also, as shown in FIG. 18, in the NE 102a, a clock looped not only through the NE 102b as a station opposite the NE 102a but also through the NE 102c is one looped through a third station other than the opposing station. Therefore, these clocks cannot be identified and consequently a closed loop 125 is formed.

SUMMARY OF THE INVENTION

The present invention was made in order to solve the problems discussed above. It is an object of the present invention to provide a transmission device and a signal transmission method in a synchronous network, whereby the formation of a clock system closed loop can be prevented even among three or more transmission devises.

In order to achieve the objective, according to an aspect of the present invention, there is provided a transmission device which employs a network synchronization system for relay-transmitting a transmission signal from a transmitting side to a receiving side in synchronization with a clock signal. The transmission device comprises a clock extracting unit for extracting a plurality of clock signals from a plurality of received signals, a selecting unit for selecting any one of the plurality of clock signals supplied from the clock extracting unit, the selected clock signal being used for transmitting a transmission signal to the receiving side, a relay-transmitting unit for relay-transmitting the transmission signal to the receiving side by using the clock signal selected by the selecting unit, an identification information notifying unit for notifying the receiving side of identification information used for identifying a clock supply system for supplying the clock signal selected by the selecting unit, a relay-receiving unit for relay-receiving the transmission signal from the transmitting side, an identification information extracting and recognizing unit for extracting and recognizing identification information regarding the clock signal contained in the transmission signal relay-received by the relay-receiving unit and an inhibition setting unit for inhibiting the selecting unit to select, as a clock signal contained in the transmission signal to be relay-transmitted, a clock signal contained in a transmission signal previously relay-transmitted by the relay-transmitting unit based on the result of recognizing the identification information by the identification information extracting and recognizing unit.

According to another aspect of the present invention, there is provided a signal transmission method in a synchronous network for relay-transmitting, through a plurality of transmission devices, a transmission signal in synchronization with a clock signal. The signal transmission method comprises the steps of receiving, when a transmission signal is relay-transmitted by a first transmission device, a plurality of transmission signals for relay-transmission, extracting a plurality of clock signals from said received transmission signals, relay-transmitting the transmission signal to a transmission device as a transmission destination by using any one of the plurality of clock signals extracted in the clock extracting step and notifying the transmission destination of identification information regarding the clock signal used for the relay-transmission in the transmitting step.

The present invention is advantageous in the following respects.

The inhibition setting unit can inhibit, as a clock signal contained in the transmission signal to be relay-transmitted, selection of a clock signal contained in the transmission signal previously relay-transmitted by the relay-transmitting unit from a plurality of clock signals supplied from the clock extracting unit based on the result of recognizing the identification information by the identification information extracting and recognizing unit. A clock signal passed through a transmission device of its own can be prevented from being used as a clock signal when information is transmitted again to other transmission devices. Thus, the formation of a clock system closed loop among three or more transmission devices can be prevented.

BRIEF DESCRIPTION OF THE DRAWINGS

These and other objects, features and advantages of the present invention will become more apparent upon reading of the following detailed description and drawings, in which:

FIG. 5(a) is a view showing an arranging example of clock specific names inserted into the STM-1 signal to be relay-transmitted on the SOH of the first embodiment;

FIG. 5(b) is a view showing an arranging example of relaying numbers inserted into the STM-1 signal to be relay-transmitted on the SOH of the first embodiment;

DESCRIPTION OF THE PREFERRED EMBODIMENTS

First, the aspects of the present invention will be described with reference to the accompanying drawings.

(A) Aspects of the Invention

Figure 1:
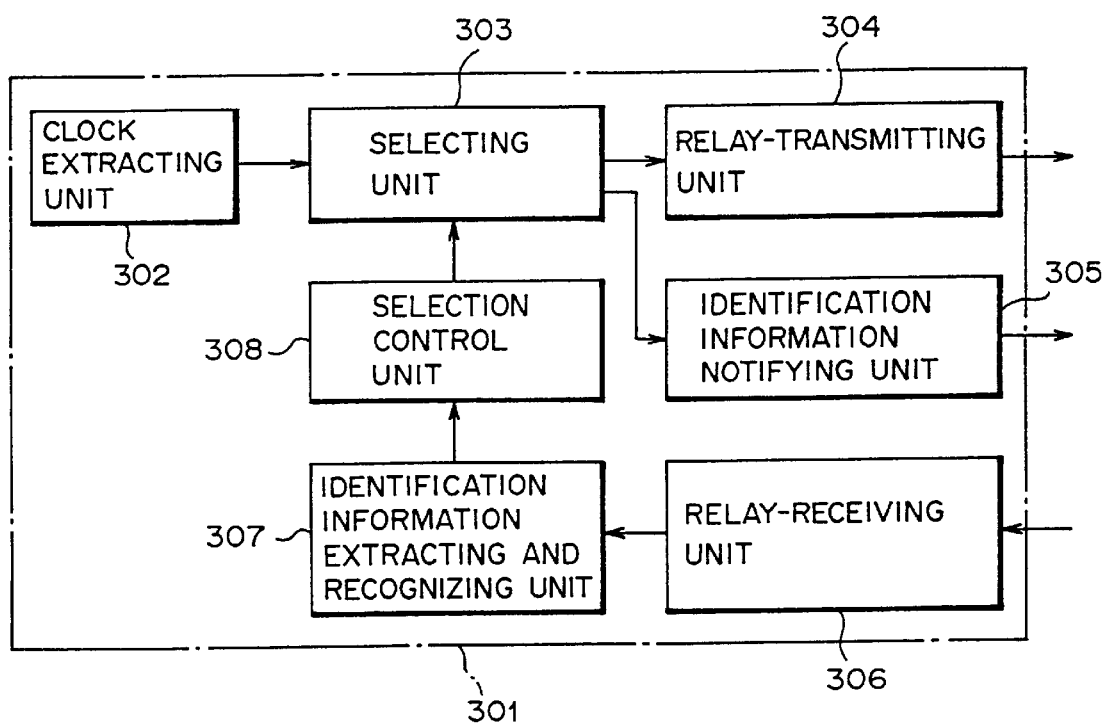
FIG. 1 is a block diagram showing an aspect of the present invention.

FIG. 1 is a block diagram showing an aspect of the present invention. Referring to FIG. 1, there is shown a transmission device denoted by a reference numeral 301, which employs a network synchronization system for relay-transmitting a transmission signal from a transmitting side to a receiving side in synchronization with a clock signal. This transmission device 301 comprises a clock extracting unit 302, a selecting unit 303, a relay-transmitting unit 304, an identification information notifying unit 305, a relay-receiving unit 306, an identification information extracting and recognizing unit 307 and an inhibition setting unit 308.

The clock extracting unit 302 extracts a plurality of clock signals from a plurality of received signals. The selecting unit 303 selects any one of the plurality of clock signals supplied from the clock extracting unit 302 to be used for transmitting a transmission signal to the receiving side under the control of the later-described inhibition setting unit 308. The relay-transmitting unit 304 relay-transmits the transmission signal to the receiving side by using the clock signal selected by the selecting unit 303.

The identification information notifying unit 305 notifies the receiving side of identification information used for identifying a clock supply system for supplying the clock signal selected by the selecting unit 303.

The relay-receiving unit 306 relay-receives the transmission signal from the transmitting side. The identification information extracting and recognizing unit 307 extracts and recognizes identification signal regarding a clock signal contained in the transmission signal relay-received by the relay-receiving unit 306.

The inhibition setting unit 308 inhibits the selecting unit 303 to select, as a clock signal contained in the transmission signal to be relay-transmitted, a clock signal contained in a transmission signal previously relay-transmitted by the relay-transmitting unit 304 based on the result of recognizing the identification information by the identification information extracting and recognizing unit 307.

The identification information to be notified by the identification information notifying unit 305 or the identification information to be extracted and recognized by the identification information extracting and recognizing unit 307 may be used, together with information for identifying a clock generation source which has produced a clock signal, for identifying the number of relaying a transmission signal among the transmission devices in synchronization with the clock signal produced by the clock generation source.

The identification information to be notified by the identification information notifying unit 305 or the identification information to be extracted and recognized by the identification extracting and recognizing unit 307 may be used for identifying a relaying history of the transmission signal among the transmission devices.

The identification information notifying unit 305 may be constructed to perform a notifying operation by adding the identification information to the transmission signal transmitted to the receiving side. The identification information extracting and recognizing unit 307 may be constructed to extract and recognize the identification information from the transmission signal relay-transmitted from the transmitting side to the receiving side.

Furthermore, the identification information may be notified to the receiving side through a data communication channel. The identification information extracting and recognizing unit 307 may be constructed to extract and recognize, through the data communication channel, the identification information from the transmission signal relay-transmitted from the transmitting side to the receiving side.

According to the present invention, the inhibition setting unit 308 can inhibit selection of, as a clock signal contained in the transmission signal to be relay-transmitted, a clock signal contained in a transmission signal previously relay-transmitted by the relay-transmitting unit 304 from a plurality of clock signals supplied from the clock extracting unit 302 based on the result of recognizing the identification information by the identification information extracting and recognizing unit 307. A clock signal passed through the transmission device of its own can be prevented from being used as a clock signal for transmitting information to the other transmission devices again. Accordingly, the formation of a clock system closed loop can be prevented among three or more transmission devices.

According to another aspect of the present invention, there is provided a signal transmission method in a synchronous network for relay-transmitting a transmission signal through a plurality of transmission devices in synchronization with a clock signal. This signal transmission method comprises the steps of receiving a plurality of transmission signals for relay-transmission when a transmission signal is to be relay-transmitted from a first transmission device, extracting a plurality of clock signals from the received transmission signals, relay-transmitting the transmission signal to the transmission device as a transmission destination by using any one of the plurality of clock signals extracted in the clock extracting step and notifying the transmission destination of identification information regarding the clock signal used for the relay-transmission performed in the transmitting step.

As described above in detail, according to the present invention, as a clock signal contained in the transmission signal to be relay-transmitted, a clock signal contained in the transmission signal previously relay-transmitted can be inhibited from being selected from the plurality of clock signals based on the result of recognizing the identification information. A clock signal passed through the transmission device of its own can be prevented from being used as a clock signal for transmitting information to the other transmission devices again. Accordingly, the formation of a clock system closed loop can be prevented among three or more transmission devices.

In this case, in the transmitting step, among the plurality of clock signals extracted in the clock extracting step, a clock signal contained in the transmission signal relay-transmitted from the first transmission device can be inhibited from being used for the relay-transmission.

(B) First Embodiment of the Invention

Next, the preferred embodiments of the present invention will be described with reference to the accompanying drawings.

Figure 3:
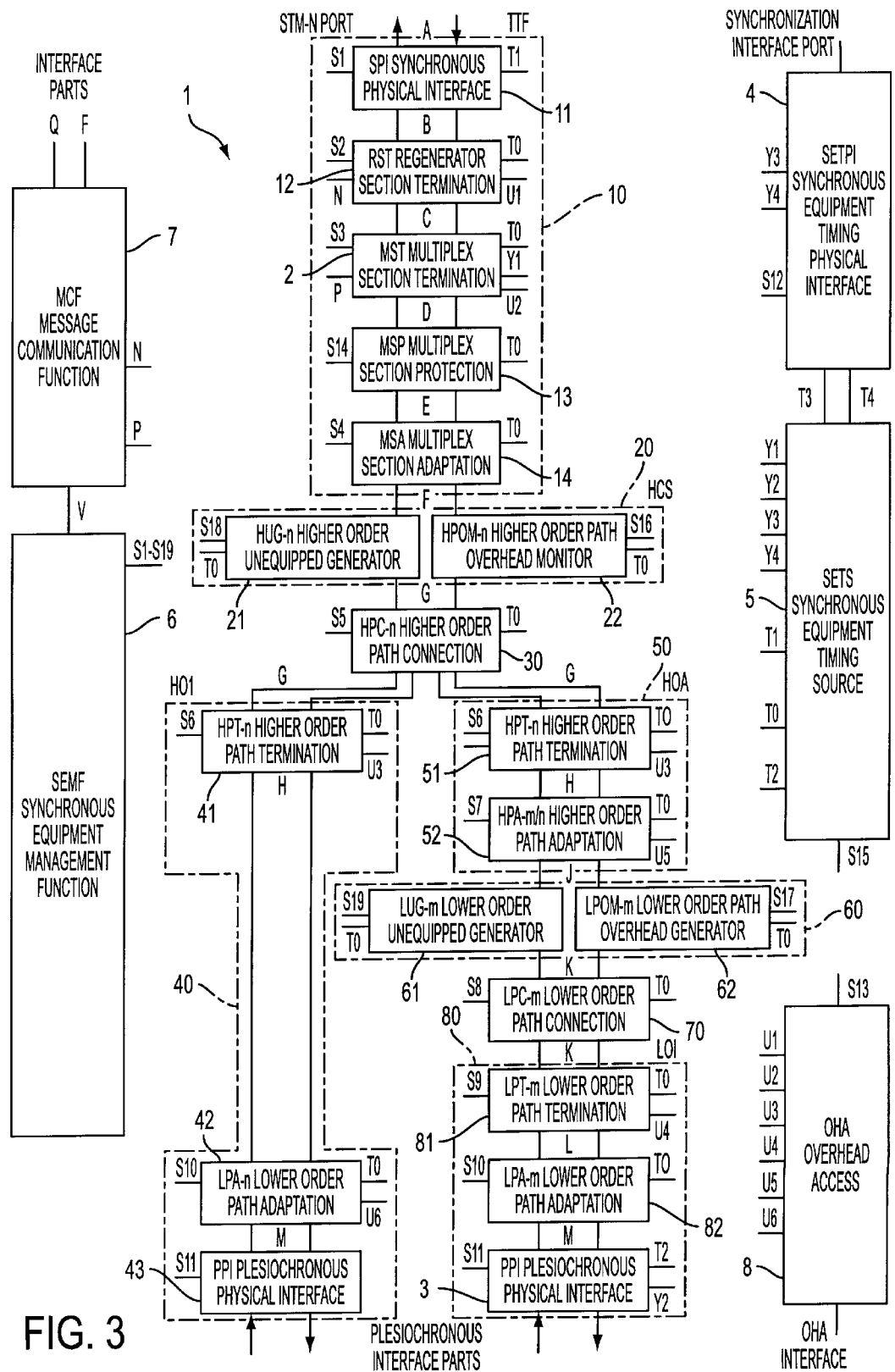
FIG. 3 is a block diagram showing the network element as a transmission device of the first embodiment of the present invention.

Referring to FIG. 3 which is a block diagram, there is shown a network element (NE) as the transmission device of the first embodiment of the present invention. An NE 1 shown in FIG. 3 employs a network synchronization system for relay-transmitting a transmission signal from a transmitting side to a receiving side in synchronization with a clock signal. This NE 1 is identical to the NE 102 of the SDH network 100 described above with reference to FIG. 15.

Figure 15:
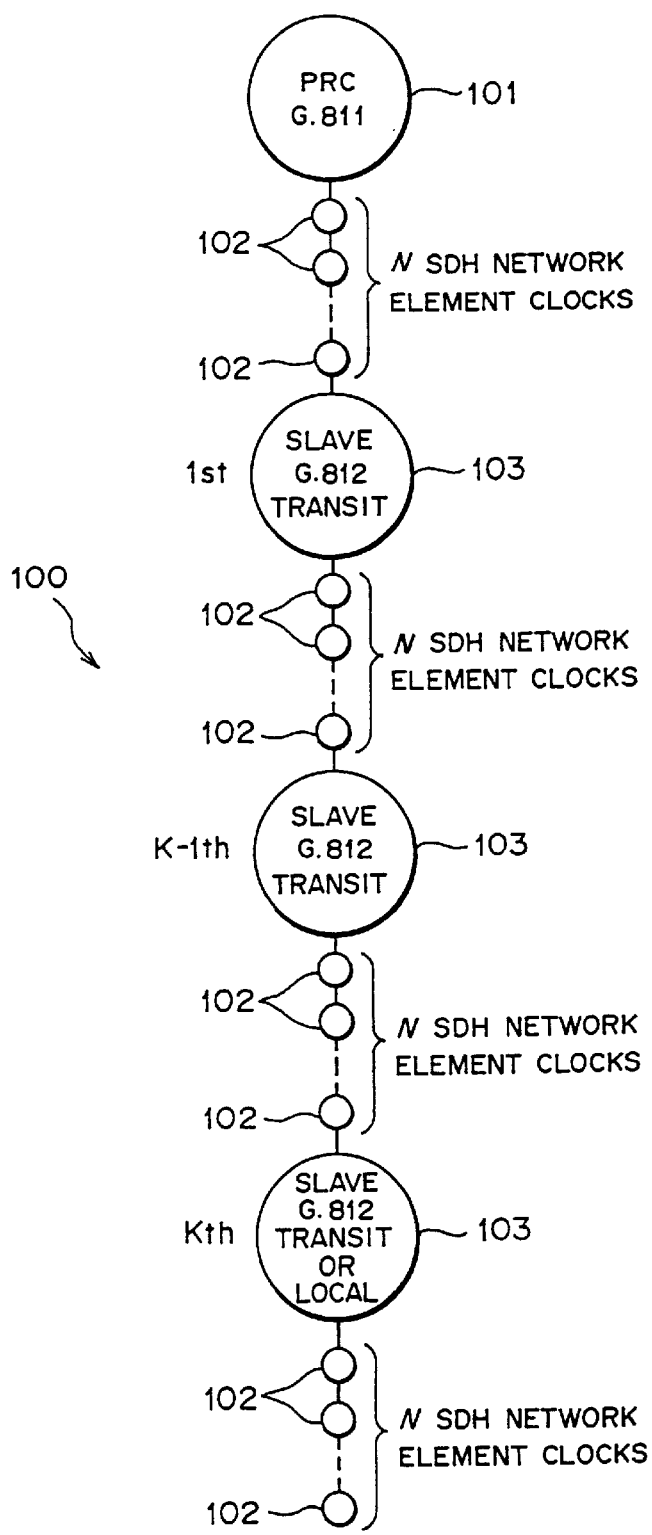
FIG. 15 is a block diagram showing an example of an SDH network of a related art, paying particular attention to a clock supply system.
Figure 16:
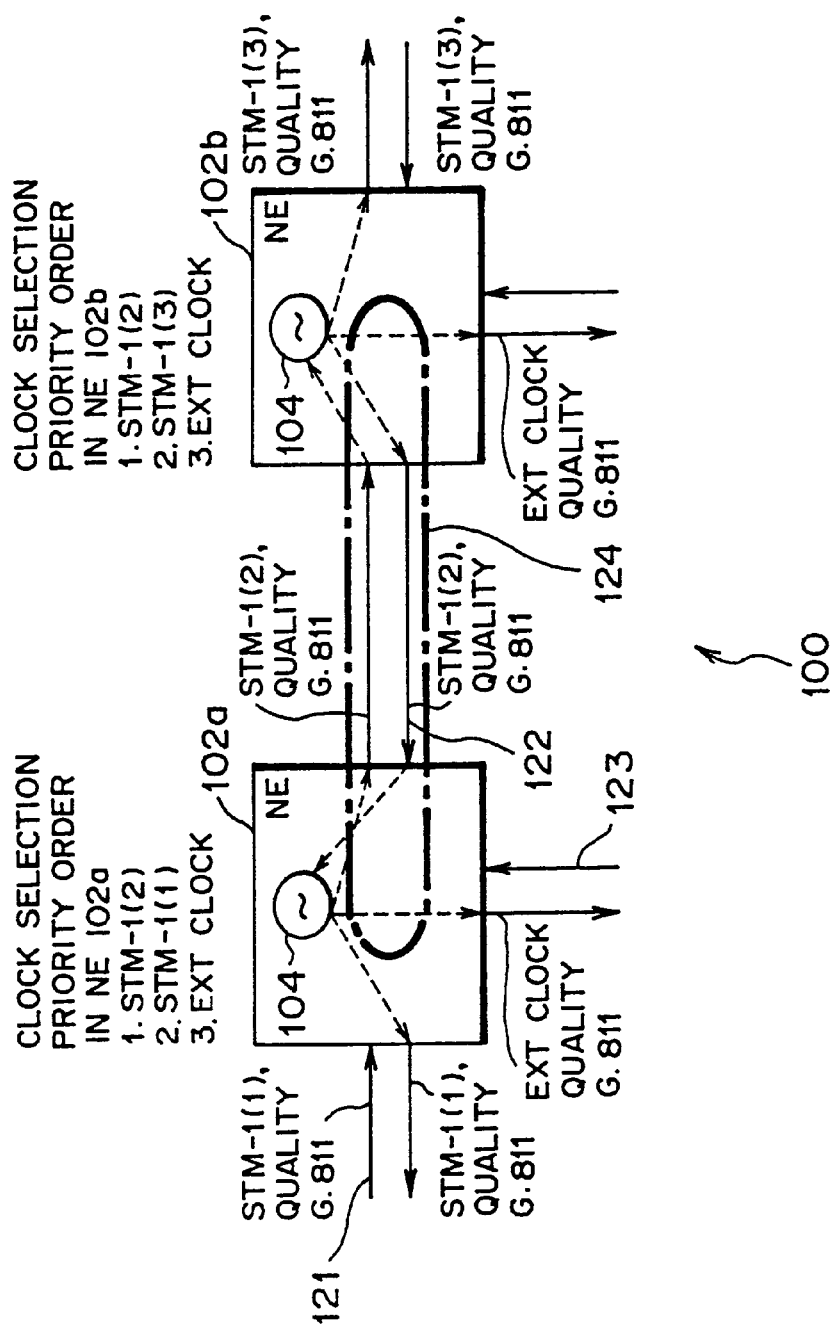
FIGS. 16 to 18 are block diagrams each is showing a clock transmission system in the SDH network of the related art.
Figure 17:
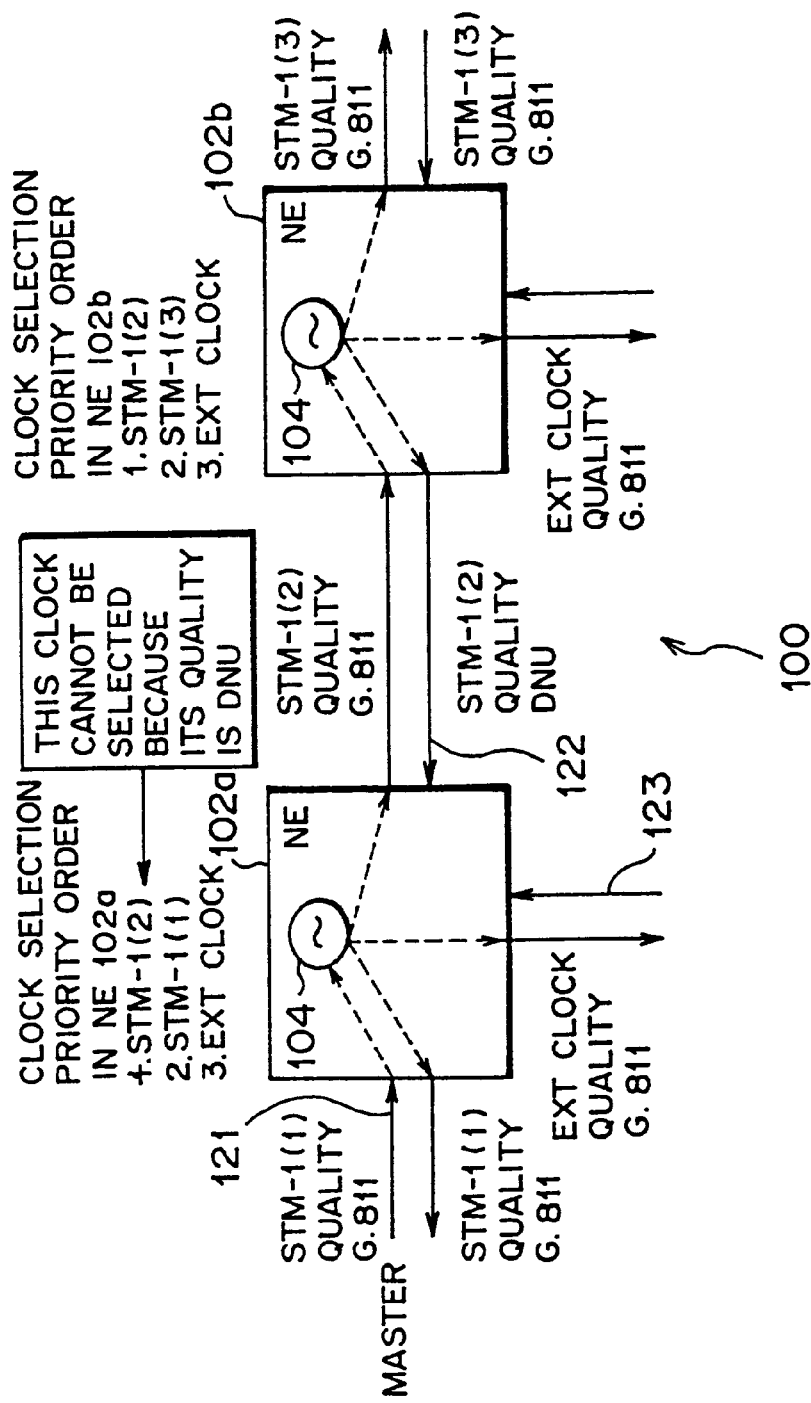
Figure 18:
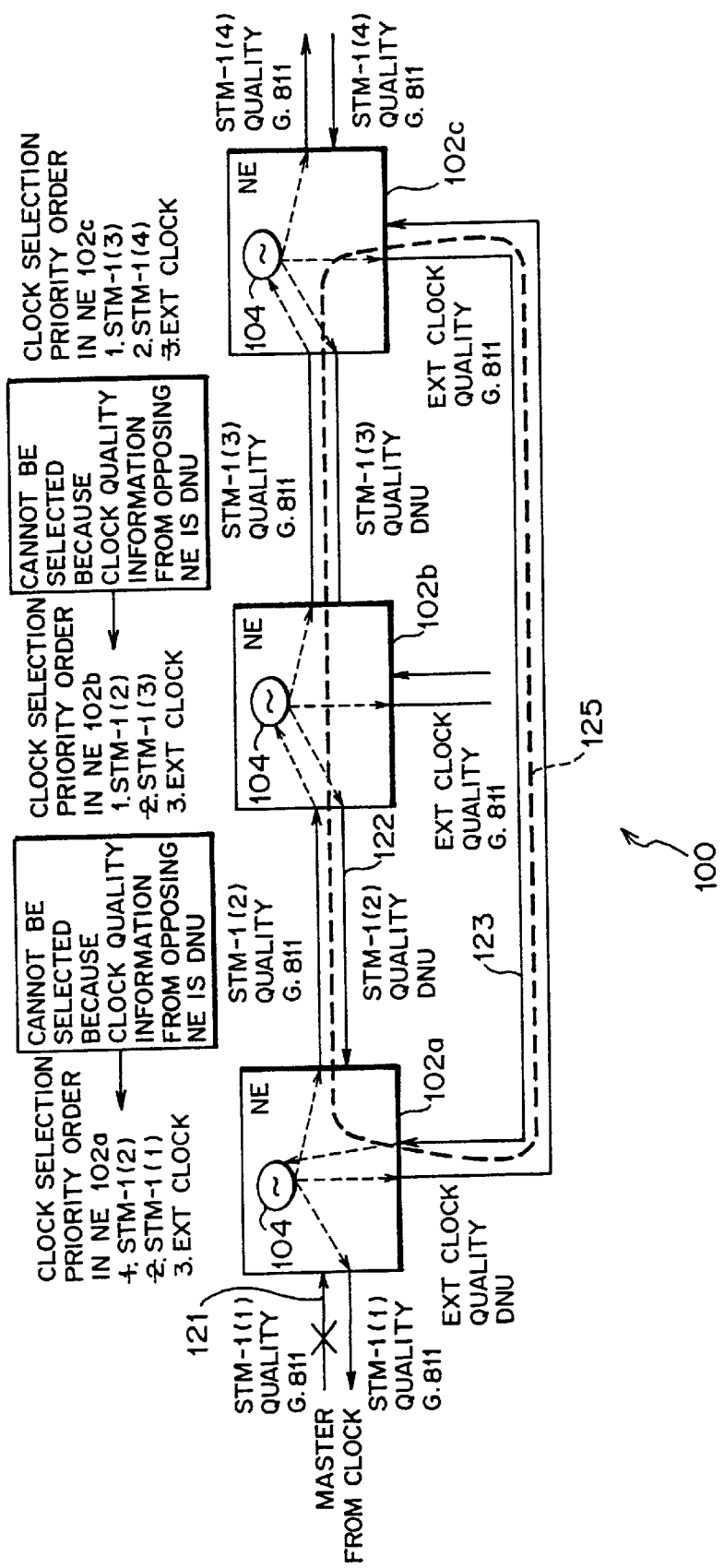

The SDH network 100 shown in FIG. 15 is an example of the SDH network, paying particular attention to the relaying system for supplying a clock signal as a master clock from the PRC 101. However, in the case of the NE 1, a network other than the SDH network, such as a 2 Mb/s hierarchical network or an external clock supply network, can be constructed as a subordinate.

Figure 2:
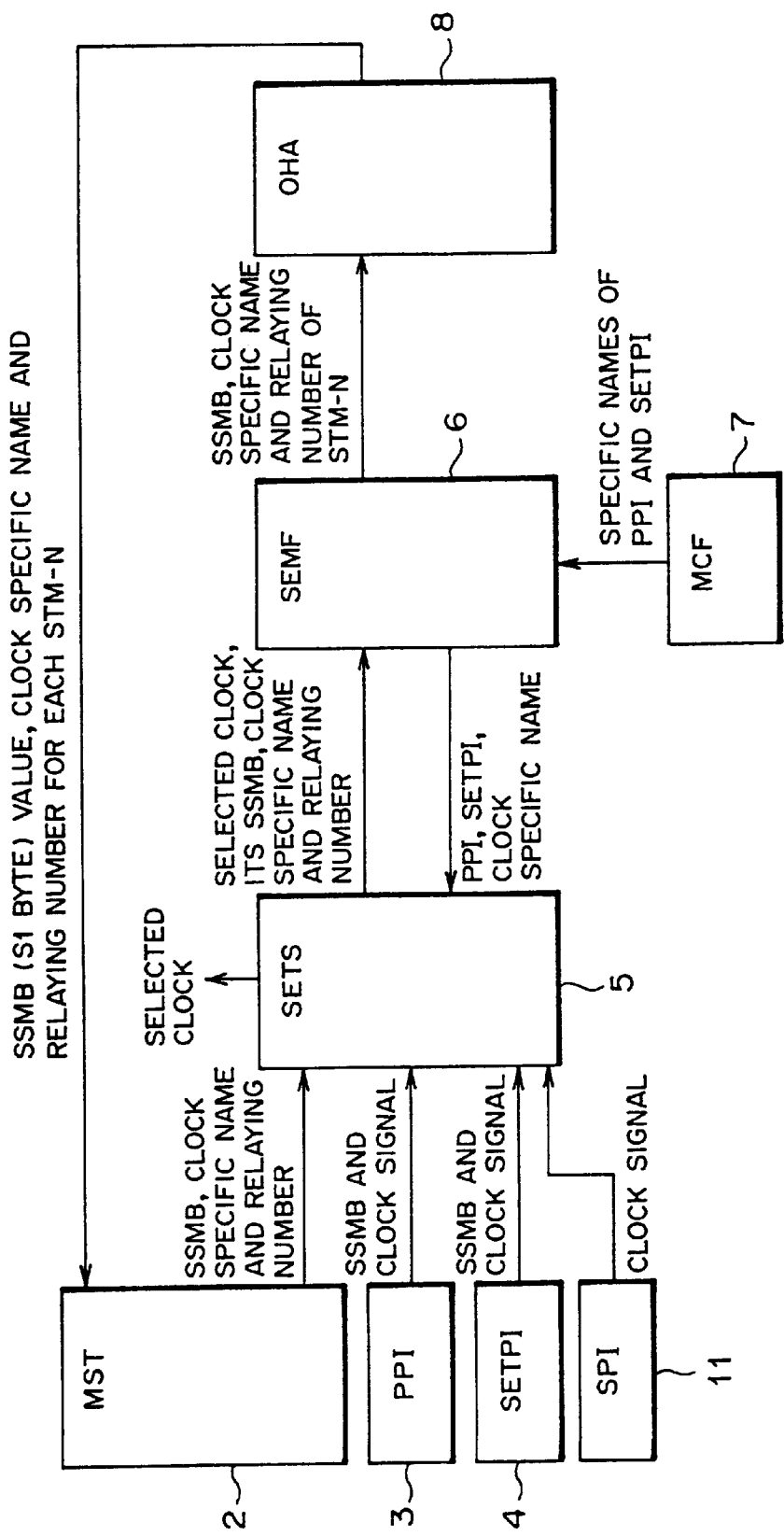
FIG. 2 is a block diagram showing main sections of a network element of a first embodiment of the present invention.

The NE 1 has a functional configuration like that shown in FIG. 2. Specifically, in the NE 1 shown in FIG. 2, a reference numeral 11 denotes a synchronous physical interface (SPI) provided in a transport terminal function (TTF) 10 (see FIG. 3). This SPI 11 receives an STM-N signal (N; a natural number) through an STM-N port from a transmission line. The SPI 11 then extracts a clock signal component from this received signal and notifies a synchronous equipment timing source (SETS) 5 of the clock signal component through a port T1. It can thus be understood that the SPI 11 functions as a relay-receiving unit for relay-receiving a transmission signal from a transmitting side.

A reference numeral 2 denotes a multiplex section termination (MST) provided in the TTF 10 (see FIG. 3). This MST 2 extracts, together with an SSMB as clock quality information, information regarding a clock specific name and the number of relaying the STM-N signal for identifying a clock signal. The MST 2 then notifies the SE-TS 5 of these bits of information through a port Y1.

Based on the information regarding the clock specific name, the device of a clock generation source in the network can be identified. Based on the information regarding the number of relaying, the number of NEs which have relayed the clock received by the NE 1 from the clock generation source can be identified.

It can thus be understood that the MST 2 functions as an identification information extracting and recognizing unit for extracting and recognizing identification information regarding the clock signal contained in the transmission signal relay-received by the SPI 11. The identification information extracted and recognized by the MST 2 includes information regarding the clock specific name for identifying the clock generation source which has produced the clock signal and information regarding the number of relaying the transmission signal among the transmission devices, the transmission signal having been transmitted in synchronization with the clock signal produced by the clock generation source.

Figure 4:
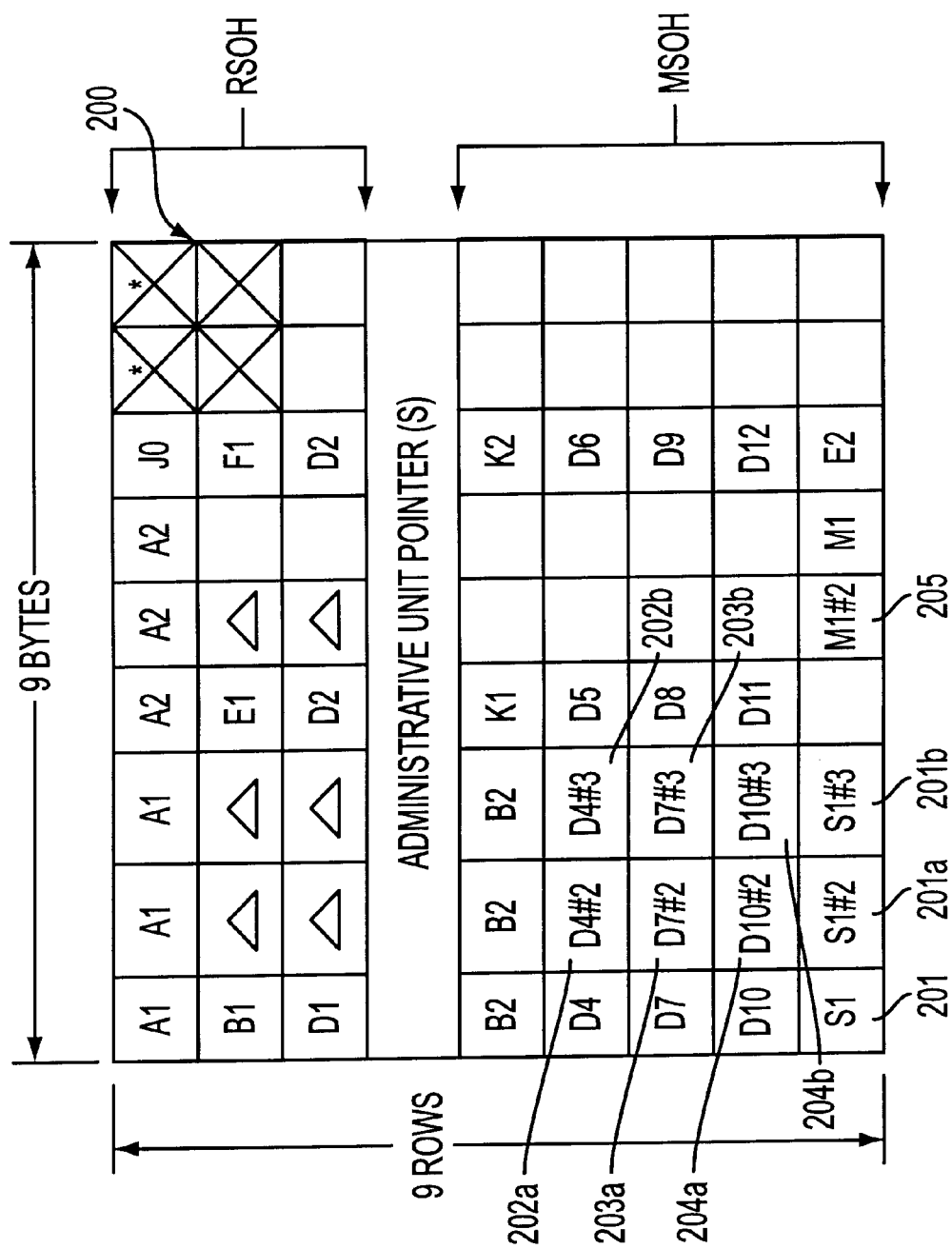
FIG. 4 is a view showing an SOH of an STM-1 signal transferred among the network elements of the first embodiment.

An SSMB multiplexed by, for instance an STM-1 frame, is recorded in low-order 4 bits in the S1 byte unit 201 of an SOH 200 shown in FIG. 4. An STM-N signal multiplexed more than an STM-1 signal can also be recorded in the S1 byte unit 201 of the STM-1 signal.

The information regarding the clock specific name for identifying the clock signal and the information regarding the number of relaying the STM-N signal are recorded in an overhead byte (OHB), for example, in the S1 #2 byte unit 201*a*, the S1 #3 byte unit 201*b*, the D4 #2 byte unit 202*a*, the D4 #3 byte unit 202*b*, the D7 #2 byte unit 203*a*, the D7 #3 byte unit 203*b*, the D10 #2 byte unit 204*a*, the D10 #3 byte unit 204*b* and the M1 #2 byte unit 205 of the SOH 200 in the STM-1 frame shown in FIG. 4.

In other words, by using 8 bytes for a clock specific name, a specific name composed of characters up to 8 in number can be permitted based on ASCII which needs 1 byte per character. By using 1 byte (at least 5 bits) for the number of relaying, the number of relaying up to "20" which is prescribed as a maximum relaying number by ITU-G. 803 can be identified.

More particularly, as shown in FIG. 5(*a*), the respective character codes of a specific name are recorded in the following manner. A first character code is recorded in the D4 #2 byte unit 202*a*, a second character code in the D4 #3 byte unit 202*b*, a third character code in the D7 #2 byte unit 203*a*, a fourth character code in the D7 #3 byte unit 203*b*, a fifth character code in the D10 #2 byte unit 204*a*, a sixth character code in the D10 #3 byte unit 204*b*, a seventh character code in the S1 #2 byte unit 201*a* and an eighth character code in the S1 #3 byte unit 201*b*.

For a relaying number, for example as shown in FIG. 5(*b*), by using only low-order 5 bits of the M1 #2 byte unit 205, each relaying number can be recorded based on a corresponding binary numeral.

For the information regarding the clock specific name and the information regarding the number of relaying, an STM-N signal is recorded according to the S1 byte unit 201 of the STM-1 signal.

A reference numeral 3 denotes a plesiochronous physical interface (PPI) provided in a lower order interface (LOI) 60. This PPI 3 extracts a clock signal from a hierarchical 2 Mbps signal which is not an SDH frame. The PPI 3 also extracts an SSMB of the clock signal. The extracted clock signal is outputted through a port T2 to the SETS 5. The extracted SSMB is outputted through a port Y2 to the SETS 5.

A reference numeral 4 denotes a synchronous equipment timing physical interface (SETPI). A clock signal inputted through a synchronization interface port from a not-shown external clock supply network is inputted as an external clock to this SETPI 4. The SETPI 4 then extracts an SSMB of the inputted clock signal.

Among the signals extracted by the SETPI 4, the clock signal is outputted through a port T3 or T4 to the SETS 5. The SSMB is outputted through a port Y3 or Y4 to the SETS 5.

It can thus be understood that a function as a clock extracting unit for extracting a plurality of clock signals from plural groups of received signals is provided by the foregoing SPI 11, PPI 3 and SETPI 4.

The bits of information inputted through the ports Y1 to Y4 and the clock specific names of the clock signals from the PPI 3 and the SETPI 4, which are notified by a later-described synchronous equipment management function (SEMF) 6, are inputted to the SETS 5. The SETS 5 selects, as an operation clock signal, any of the three kinds of clock signals (clock signals extracted by the SPI 11, the PPI 3 and the SETPI 4) inputted through the ports T1 to T3 or T4.

In other words, the SETS 5 has a function as a selecting unit for selecting any one of the plurality of clock signals supplied from the SPI 11, the PPI 3 and the SETPI 4 for transmitting a transmission signal to the receiving side.

Specifically, in the SETS 5, a priority order is set beforehand for clock signal selection. If the clock signals are received from the same direction, based on information regarding an SSMB of each of the three kinds of clock signals, clock specified names and relaying numbers, only the clock signal having a smaller relaying number can be selected while the clock signals having large relaying numbers cannot be selected.

If the existence of clock signals from the same clock supply source and having equal relaying numbers is determined, only the clock signal high in the preset priority order can be selected while the clocks low in the priority order cannot be selected. In other words, in the SETS 5, even if a signal transmitting a selected clock signal is abnormal, no switching is made to a clock signal low in the priority order.

Accordingly, in the SETS 5, if clock signals relayed from the same clock supply source are included in the clocks inputted to the NE 1 of its own, a clock signal high in the priority order and having a smaller relaying number is selected. Thus, for rely-transmission among the NEs, a clock signal passed through of the NE of its own is prevented from being used again when a transmission signal is transmitted.

It can thus be understood that the SETS 5 functions as an inhibition setting unit, which inhibits selection of, as a clock signal contained in a transmission signal to be relay-transmitted, a clock signal contained in the transmission signal previously relay-transmitted by the SPI 11 in its own NE from the plurality of clock signals supplied from the SPI 11, the PPI 3 and the SETPI 4 based on the result of recognizing identification information in the MST 2-1.

The SETS 5 outputs the clock signal selected in the above-described manner through a port T0. The SETS 5 also outputs bits of information regarding the SSMB of the selected clock signal, the clock specific name and the relaying number through a port S15 to the SEMF 6.

The SEMF 6 notifies, for clock signal selection, the SETS 5 of the clock specific names of the clock signals from the PPI 3 and the SETPI 4 managed by a message communication function (MCF) 7 through the port S15. The SEMF 6 receives bits of information regarding the SSMB, the clock specific name and the relaying number of the clock signal selected by the SETS 5 through the port S15. After receiving these bits of information, the SEMF 6 recognizes a transmission frame (e.g., identifies the channel number of a STM-1) corresponding to the clock signal.

An overhead access (OHA) 8 receives bits of information regarding the SSMB, the clock specific name and the relaying number of the clock signal of the transmission frame recognized by identifying the channel number in the SEMF 6 through a port S13. The OHA 8 then accesses the MST 2 through a port U2 in order to multiplex the bits of information received through the port S13 in the SOH of the transmission frame.

For example as shown in FIG. 4, the OHA 8 accesses the MST 2 through the port U2 in order to set an SSMB in the low-order 4 bits of the S1 byte unit 201 of the SOH 200 of the transmission frame.

Similarly, the OHA 8 accesses the MST 2 through the port U2 in order to set clock specific names expressed based on ASCII in the S1 #2 byte unit 201a, the S1 #3 byte unit 201b, the D4 #2 byte unit 202a, the D4 #3 byte unit 202b, the D7 #2 byte unit 203a, the D7 #3 byte unit 203b, the D10 #2 byte unit 204a and the D10 #3 byte unit 204b of the SOH 200 of the transmission frame.

Furthermore, the OHA 8 accesses the MST 2 through the port U2 in order to set bit information indicating a relaying number in the M1 #2 byte unit 205 of the SOH 200 of the transmission frame.

Accordingly, the transmission signal having the clock specific name and the relaying number multiplexed in the SOH 200 is relay-transmitted from the SPI 11 through the STM-N port. In other words, the SPI 11 functions as a relay-transmitting unit for relay-transmitting the transmission signal to the receiving side by using the clock signal selected by the SETS 5. The MST 2 functions as an identification information notifying unit, which notifies the receiving side of identification information used for identifying a clock supply system for supplying the clock signal selected by the SETS 5.

The identification information notified by the MST 2 includes information for identifying the clock generation source which has produced the clock signal and information regarding the number of relaying the transmission signal among the transmission devices, the transmission signal having been transmitted in synchronization with the clock signal produced by the clock generation source.

In FIG. 3, a reference numeral 20 denotes a higher order connection supervision (HCS), 30 a higher order path connection (HPC)-n, 40 a higher order interface (HOI), 50 a higher order assembler (HOA), 60 a lower order connection supervision (LCS) and 70 a lower order path connection (LPC)-m.

The TTF 10 includes, in addition to the SPI 11 and the MST 3, a regenerator section termination (RST) 12, a multiplex section protection (MSP) 13 and a multiplex section adaptation (MSA) 14. The HCS 20 includes a higher order unequipped generator (HUG)-n 21 and a higher order path overhead monitor (HPOM)-n. The HOI 40 includes a higher order path termination (HPT)-n 41, a lower order path adaptation (LPA)-n 42 and a PPI 43. The HOA 50 includes a HPT-n 51 and a higher order path adaptation (HPA)-m/n 52. The LCS 60 includes a lower order unequipped generator (LUG)-m 61 and a lower order path overhead monitor (LPOM)-m 62. A lower order interface (LOI) 80 includes, in addition to the PPI 3, a lower order path termination (LPT)-m 81 and a lower order path adaptation (LPA)-m 82.

Figure 6:
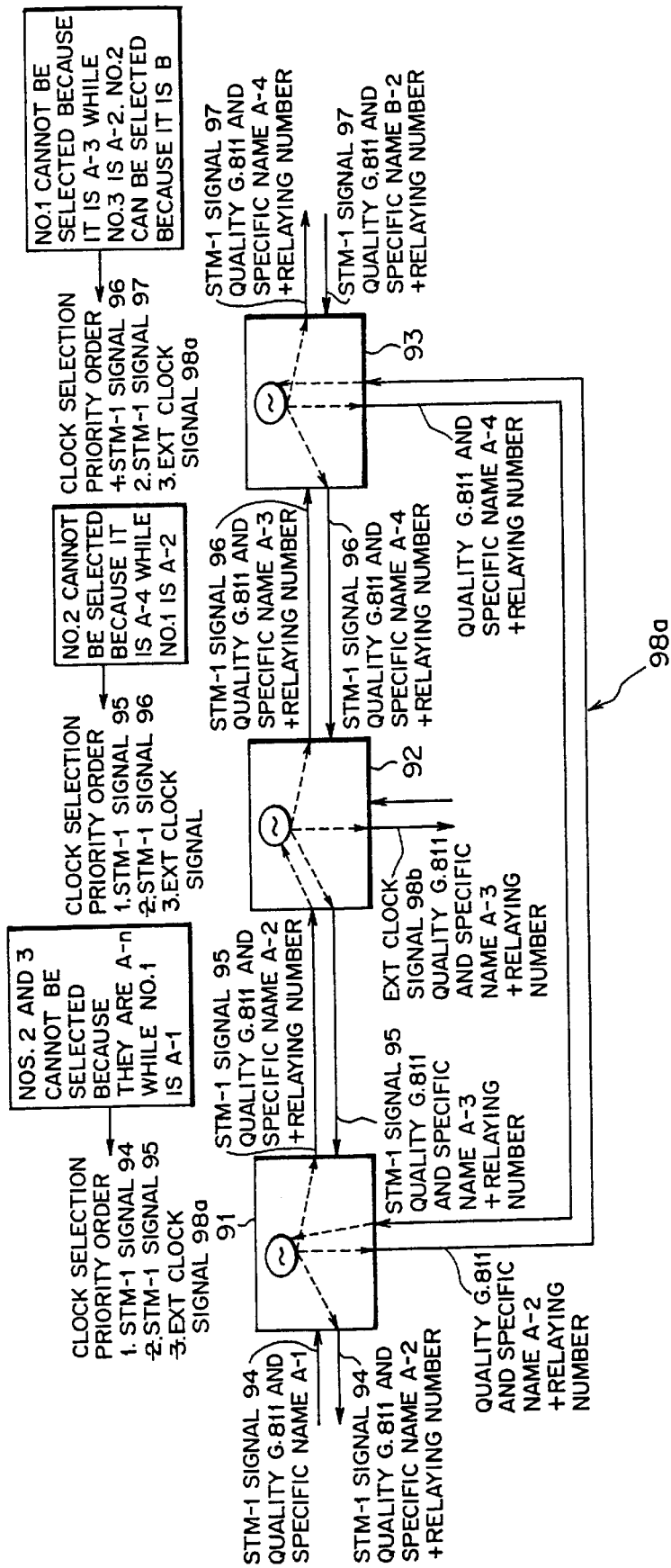
FIG. 6 is a block diagram illustrating an operation of an SDH network configured by including the network elements as the transmission devices of the first embodiment.

In an SDH network configured by including three NEs 91 to 93 similar in configuration to the NE 1 as the transmission device of the foregoing first embodiment of the present invention, the formation of a closed loop can be prevented as shown in FIG. 6.

More particularly, in the case of the NE 91, an STM-1 signal 94 as a transmission signal (transmission signal relayed through one NE) is transferred with a not-shown NE. An STM-1 signal 95 is transferred with the NE 92. An EXT CLOCK signal 98a is transferred with the NE 93 via an external clock supply network 98. This EXT CLOCK signal 98a has a hierarchical transfer speed of, for instance 2 Mbps.

Similarly, in the case of the NE 92, in addition to the STM-1 signal 95 transferred with the NE 91, an STM-1 signal 96 is transferred with the NE 93. An EXT CLOCK signal 98b is transferred with the external clock supply network 98.

In the case of the NE 93, in addition to the STM-1 signal 96 transferred with the NE 92 and the EXT CLOCK signal 98a transferred with the NE 91 via the external clock supply network 98, an STM-1 signal 97 is transferred with a not-shown NE.

In the NEs 91 to 93, for relay-transmitting the STM-1 signals 94 to 97 or the EXT CLOCK signals 98a and 98b to the other NE, optimal clock signals selected from the STM-1 signals 94 to 97 or the EXT CLOCK signals 98a and 98b relay-transmitted by the respective NEs are used as transmission clock signals.

Thus, the NEs 91 to 93 functioning as clock signal sources in the network output not only clock signals but also information regarding new clock signals to the clock signal receiving NE. In the NE which has received the clock signals, any of the received clock signals are selected as device clock signals (transmission clock signals). During this period, the NE receives clock signal identification information together with the clock signals and determines whether these clock signals can be selected or not based on the received identification information.

At this time, for the signal to be relay-transmitted, bits of information regarding the SSMB of the clock signals selected as the transmission clock signals, the specific names thereof and the number of relaying the clock signals from the master are multiplexed with an OHB signal. The signal is then transmitted.

In other words, if selection is determined to be possible by referring to the clock identification information, the clock signal is selected and set as a reference clock signal. Accordingly, all the main signals outputted from the NEs 91 to 93 are produced based on the reference clock signal. The information regarding the received clock signal is processed in the NE of its own and then outputted to the NE connected to this NE.

If the information regarding the clock signal to be selected includes information which does not allow selection, the SETS 5 inhibits the selection of this clock signal.

For example, in the NE 91, the clock signal of the STM-1 signal 94 from the not-shown NE and the clock signal of the STM-1 signal 95 from the NE 92 are extracted by the SPI 11. The clock signal of the EXT CLOCK 98a is also extracted by the SETPI 4.

In the MST 2 of the NE 91, the SSMB, the clock specific names and the relaying numbers of the STM-1 signals 94 and 95 recorded in the SOH 200 are respectively extracted. In the SETPI 4, the SSMB of the EXT CLOCK signal 98a is extracted. In the MCF 7, the clock specific name and the relaying number of the EXT CLOCK signal 98a are extracted.

In the SETS 5 of the NE 91, a clock signal is selected to be used for the signal to be relay-transmitted. In this case, among the three kinds of clock signals extracted in the above-described manner, a clock signal having best quality and a smallest relaying number is selected based on a preset clock selection priority order and the SSMB, the clock specific names and the relaying numbers of the respective clock signals.

In the NE 91, in the preset clock selection priority order, the clock signal of the STM-1 signal 94 is first (No. 1), the clock signal of the STM-1 signal 95 second and the clock signal of the EXT CLOCK signal 98a is third.

In this case, the clock signal first in the priority order (clock signal of the STM-1 signal 94) is selected among the clock signal of the STM-1 signal 94 (clock specific name "A" and relaying number "1"; expressed by "A-1" in FIG. 6), the clock signal of the STM-1 signal 95 (clock specific name "A" and relaying number "3") and the clock signal of the EXT CLOCK signal 98a (clock specific name "A" and relaying number "4" which are all extracted in the NE 91.

In other words, the clock specific name and the relaying number of the clock signal first in the priority order are "A-1" (relationship between the clock specific name and the relaying number is expressed in this manner, hereinafter). The clock signals second and third in the priority order are both "A-n". Accordingly, the clock signals second and third in the priority order are excluded from the choices, and the clock signal first in priority the order is selected.

After the clock signal used for the transmission signal to be relay-transmitted has been selected in the SETS 5, the SSMB, the clock specific name and the relaying number of the selected clock signal are multiplexed with the same OHB as that of the relay-receiving frame and then transmitted through the STM-N port to the SOH of the transmission signal to be relay-transmitted by the SEMF 6, the OHA 8 and the MST 2.

After the clock signal has been selected in the SETS 5, in the SETPI 4, the selected clock signal is sent out as an external clock signal (EXT CLOCK signal 98a or 98b) through a synchronization interface port.

Also, in the case of the disconnected clock signal of the STM-1 signal 94, the clock signals second and third in the priority order are not selected if the clock signal first in the priority order is used. Then, by temporarily using clock signal information stored in the NE 9, relay-transmission is continued.

Similarly, in the NE 95, the clock specific name and the relaying number of the clock signal first in the priority order (clock signal of the STM-1 signal 95) is "A-2", and the clock signal second in the priority order is "A-4". Accordingly, the clock signal second in the priority order is excluded from the choices. The clock signal highest, that is, first in the priority order is selected.

If the clock signal of the STM-1 signal 95 is disconnected, the clock signal second in the priority order is not selected. Then, relay-transmission is continued by using the EXT CLOCK signal 98b third in the priority order.

In the NE 96, the clock specific name and the relaying number of the clock signal first in the priority order (clock signal of the STM-1 signal 96) are "A-3", and the clock signal third in the order is "A-2". Accordingly, the clock signal first in the priority order is excluded from the choices.

Then, for example, for relay-transmitting transmission signals by the NE 91 as a first transmission device, a plurality of transmission signals are received for relaying by the SPI 11 of the NE 91. In the SPI 11, PPI 3 and the SETPI 4, a plurality of clock signals are then extracted from the received transmission signals (clock extracting step).

Then, mainly by the SETS 5, the SEMF 6, the MCF 7, the OHA 8, the MST 2 and the SPI 11, the transmission signals are relay-transmitted to the transmission device as a transmission destination by using any one of the plurality of clock signals extracted in the clock extracting step (transmitting step). Then, based on information multiplexed with an OHB signal in the MST 2, identification information regarding the clock signal used for the relay-transmission in the transmitting step can be notified to the transmission destination (identification information notifying step).

In this case, mainly by the SETS 5, among the plurality of clock signals extracted in the clock extracting step, a clock signal contained in the transmission signal relay-transmitted from the first transmission device can be inhibited from being used for the foregoing relay-transmission.

The network element as the transmission device of the first embodiment of the present invention is advantageous in the following respect.

The SETS 5 inhibits selection of, as a clock signal contained in a transmission signal to be relay-transmitted, a clock signal contained in a transmission signal previously relay-transmitted by the SPI 11 of the NE 1 of its own from a plurality of clock signals supplied from the SPI 11, the PPI 3 and the SETPI 4 based on the result of recognizing information regarding clock specific names and relaying numbers by the MST 2. Accordingly, by preventing a clock signal passed through the NE 1 of its own from being used for transmitting information to the other NE again, the formation of a clock system closed loop can be prevented.

Bits of information regarding the clock specific names and the relaying numbers are inserted and separated from each other in the same station as that of SSMB information. Thus, these bits of information can be positioned on a multiplex section overhead (MSOH).

(B1) Modified Example of the First Embodiment

Figure 7:
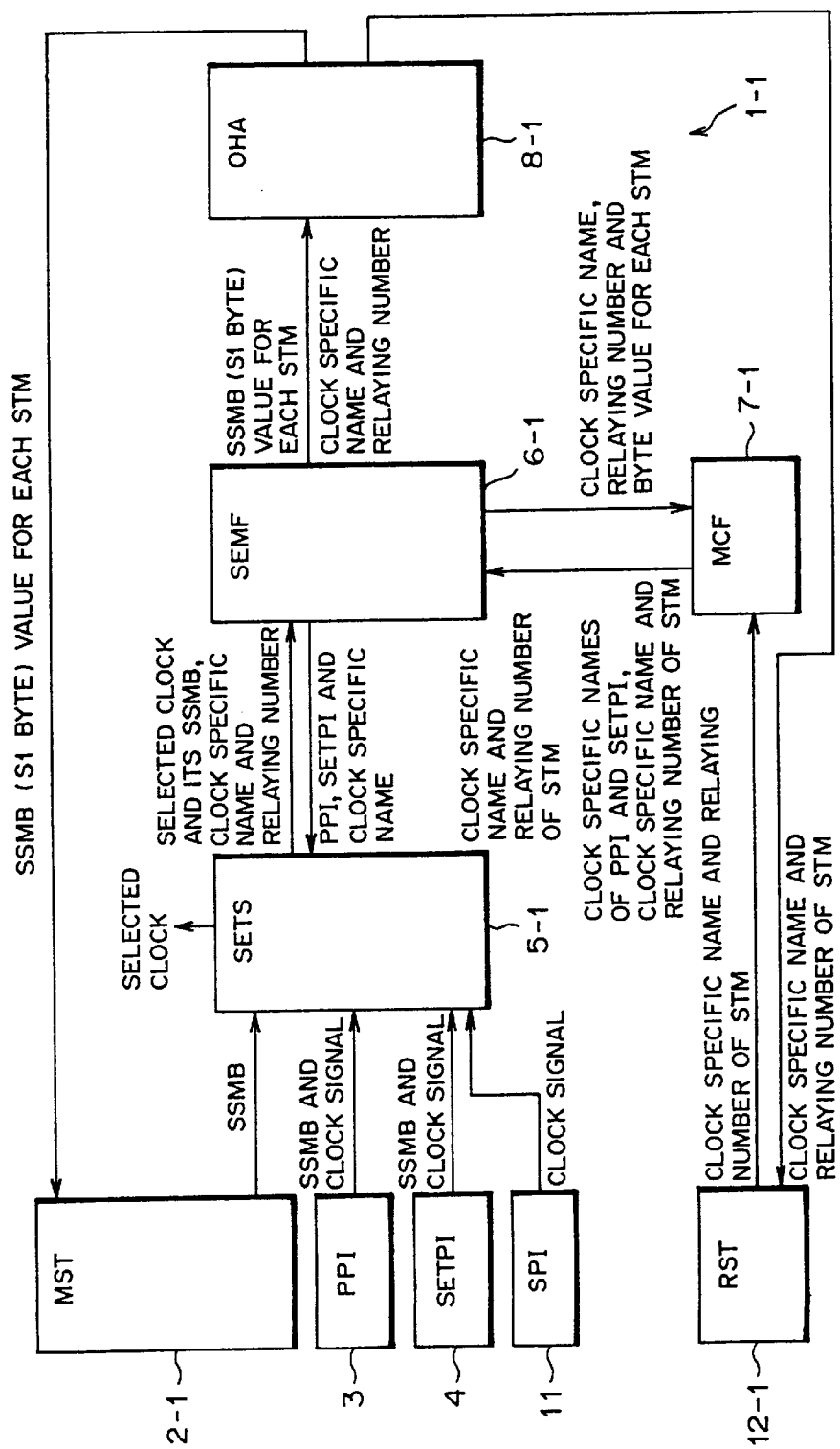
FIG. 7 is a block diagram showing main sections of a network element of a modified example of the first embodiment.

Referring to FIG. 7 which is a block diagram, there are shown main sections of an NE as the transmission device of the modified example of the present invention. For its details, an NE 1-1 shown in FIG. 7 is basically configured by including the same function units as those of the NE shown in FIG. 3.

Figure 8:
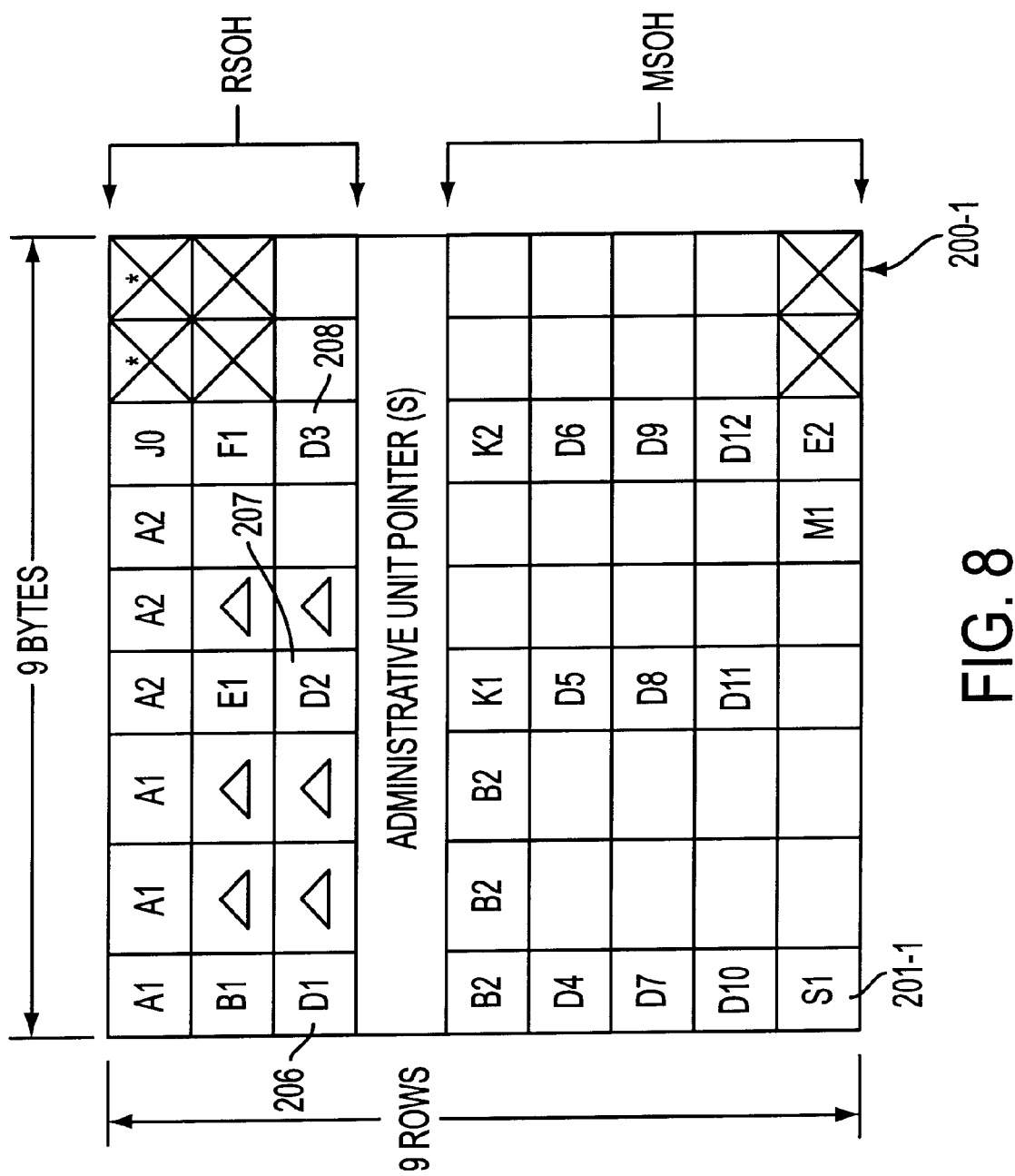
FIG. 8 is a view showing an SOH of an STM-1 signal transferred among the network elements of the modified example of the first embodiment.

The NE 1-1 shown in FIG. 7 is different from the NE of the first embodiment in that the clock specific name and the relaying number of a clock signal selected for relay-transmission are recorded not in the unused byte units of the MSOH but, for example as shown in FIG. 8, in a D1 byte unit 206 to a D3 byte unit 208 (for STM-1).

Different from the NE of the first embodiment (see the reference numeral 1 in FIG. 3), the NE 1-1 of the modified example includes an MST 2-1, an SETS 5-1, an SEMF 6-1, an MCF 7-1, an OHA 8-1 and an RST 12-1. Other units are basically the same as those of the NE of the first embodiment.

More particularly, a relay-transmitted STM-N signal is inputted through the SPI 11 at the TTF 10 to the RST 12-1. The RST 12-1 extracts information regarding a clock signal for identifying the clock signal of the STM-N signal and information regarding the relaying number of the same from the Dl byte unit 206 to the D3 byte unit 203. The RST 12-1 then notifies the MCF 7-1 of its extracting results.

The MST 2-1 extracts an SSMB recorded as clock signal quality information in the S1 byte unit (see the reference numeral 201 in FIG. 4) from the STM-N signal (N; a natural number) from the RST 12-1. The MST 2-1 then notifies the SETS 5-1 of its extracting result.

The MCF 7-1 outputs, together with the clock specific names of clock signals from the PPI 3 and the SETPI 4, the bits of information regarding the clock specific name and the relaying number of the STM-N signal extracted in the RST 12-1 through a port V to the SEMF 6-1. The SEMF 6-1 outputs the bits of information inputted from the MCD 7-1 to the SETS 5-1 through a port S15.

An SSMB from each of the MST 2-1, the PPI 3 and the SETPI 4, the clock specific names of the clock signals from the PPI 3 and the SETPI 4 notified by the SEMF 6-1 and the clock specific name and the relaying number of the clock signal of the relay-transmitted STM-N signal are inputted to the SETS 5-1. As in the case of the first embodiment, the SETS 5-1 selects any one of three kinds of clock signals inputted through the ports T1 to T4 as an operation clock signal based on the foregoing inputted bits of information and a preset clock selection priority order.

In other words, the SEMF 6-1 notifies the SETS 5-1 of the clock specific names of the three kinds of clock signals notified by the MCF 7-1 and the relaying number of the STM-N signal through the port S15. The SEMF 6-1 also receives information regarding the SSMB, the clock specific name and the relaying number of the clock signal selected by the SETS 5-1 through the port S15. The SEMF 6-1 then recognizes a transmission frame (e.g., identifying the channel number of the STM-1 signal) corresponding to the clock signal.

The SEMF 6-1 outputs, together with a clock specific name and a relaying number for each STM-1 signal and values to be recorded in the D1 byte unit 206 to the D3 byte unit 208 of an SOH 200-1, an SSMB value to the OHA 8-1.

The OHA 8-1 accesses the MST 2-1 through the port U2. Thereby, the OHA 8-1 can set the SSMB of the selected clock signal in the S1 byte unit 201 of the SOH 200-1 for the STM-1 signal for relay-transmission.

The OHA 8-1 notifies, through the port U1, the RST 12-1 of the clock specific name and the relaying number of each STM-1 signal notified by the SEMF 6-1. The RST 12-1 can set the clock specific name and the relaying number of the selected clock signal in the D1 byte unit 206 to the D3 byte unit 208 of the SOH 200-1 for the STM-1 signal for relay-transmission.

Thus, the clock specific name and the relaying number for identifying a clock supply system can be notified to the receiving side through a data communication channel. The MST 2 can receive and recognize, through the data communication channel, the clock specific name and the relaying number of the clock signal contained in the transmission signal to be relay-transmitted from the transmitting side to the receiving side.

By configuring an SHD network by including three NEs 91 to 93 each having the same configuration as that of the NE 1-1 as the transmission device of the modified example of the first embodiment of the present invention, the formation of a closed loop can be prevented as in the case of the first embodiment (see FIG. 6).

The NE of the modified example of the first embodiment is advantageous in the following respect.

As in the first embodiment, the SETS 5-1 can inhibit selection of, as a clock signal contained in a transmission signal to be relay-transmitted, a clock signal contained in a transmission signal previously relay-transmitted by the SPI 11 of the NE 1-1 of its own from a plurality of clock signals supplied from the SPI 11, the PPI 3 and the SETPI 4 based on the result of recognizing information regarding a clock specific name and a relaying number by the MST 2-1. Accordingly, a clock signal passed through the NE 1-1 of its own can be prevented from being used for transmitting information to the other NE again, and the formation of a clock system closed loop among three or more NEs can be prevented.

(C) Second Embodiment

Figure 9:
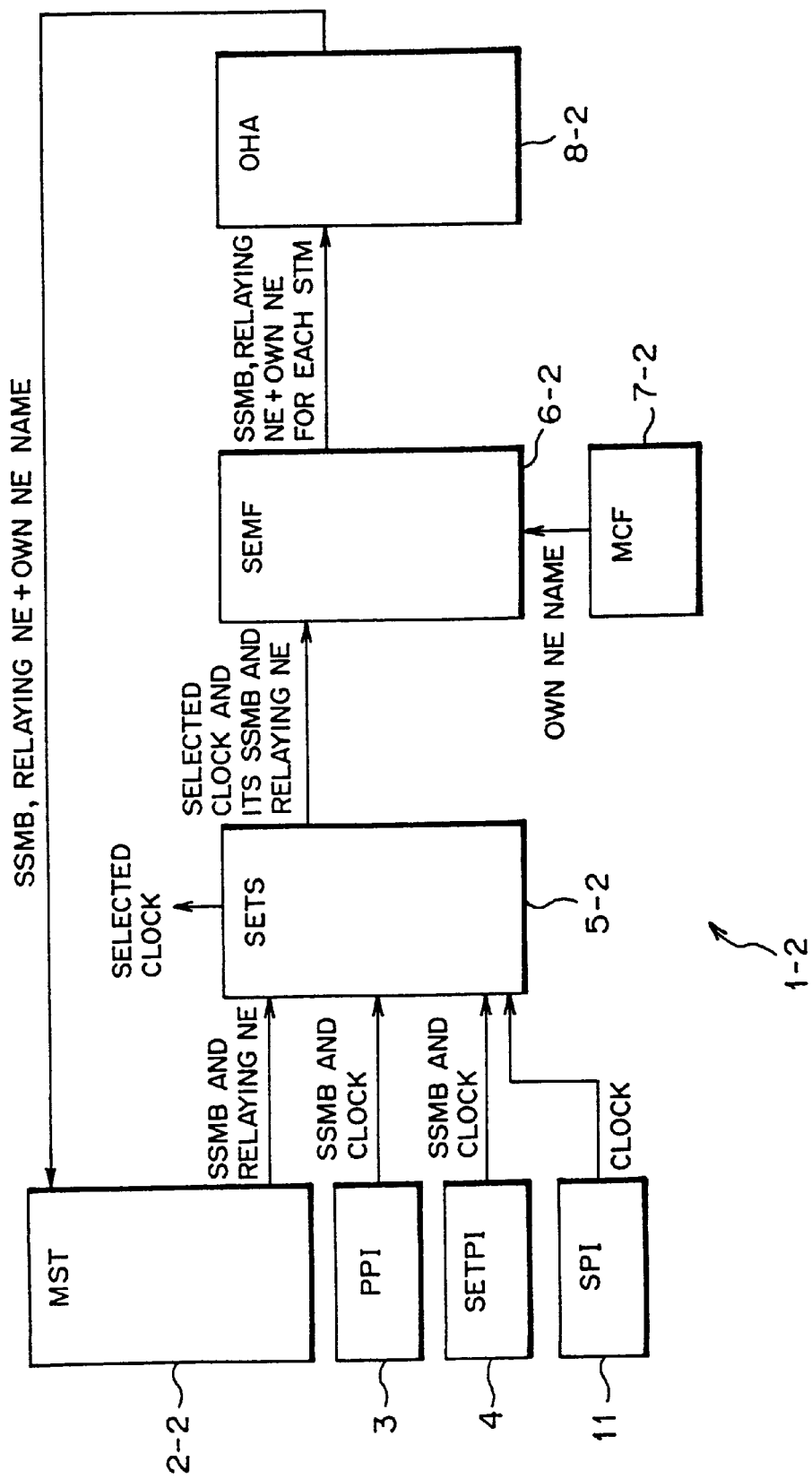
FIG. 9 is a block diagram showing main sections of a network element of a second embodiment of the present invention.

Referring to FIG. 9 which is a block diagram, there are shown main sections of an NE as the transmission device of the second embodiment. For its details, an NE 1-2 shown in FIG. 9 is basically configured by including the same function units as those of the NE shown in FIG. 3.

The NE 1-2 shown in FIG. 9 is different from the NE of the first embodiment in that instead of the clock specific name and the relaying number of a clock signal selected for relay-transmission, the relaying history of a transmission signal, that is, information regarding the NE through which the transmission signal is passed, is recorded in the OHB signal of the SDH frame.

In other words, in the NE 1-2 of the second embodiment, for identification information to be notified by the MST 2, information regarding the relaying history of the transmission signal among the transmission devices is used.

Different from the NE of the first embodiment (see the reference numeral 1), the NE 1-2 of the second embodiment includes an MST 2-2, an SETS 5-2, an SEMF 6-2, an MCF 7-2 and an OHA 8-2. Other units are basically the same as those of the ME of the first embodiment.

The SPI 11, the PPI 3 and the SETPI 4 (see FIG. 3) function as a clock extracting unit for extracting a plurality of clock signals from a plurality of received signals. The SPI 11 functions as a relay-receiving unit for relay-receiving a transmission signal from the transmitting side.

As in the case of the MST of the first 110 embodiment (see the reference numeral 2), a relay-received STM-N signal is inputted through the SPI 11 of the TTF 10 to the MST 2-2, and the SSMB of the inputted STM-N signal is extracted as clock quality information from the S1 byte unit 201 (see FIG. 4). However, this MST 2-2 is different from the MST of the first embodiment in that information regarding an NE through which the STM-N signal is passed, indicating the relaying history thereof, is extracted from an M1 #2 byte unit 205-2. The result of extraction is notified through the port Y1 to the SETS 5-2.

It can thus be understood that the MST 2-2 functions as an identification information extracting and recognizing unit for extracting and recognizing identification information regarding a clock signal contained in the transmission signal relay received by the SPI 11.

The bits of information regarding an SSMB and the NE through which the transmission signal is passed are inputted to the SETS 5-2 from the MST 22. Information regarding an SSMB is also inputted from the PPI 3 and the SETPI 4. The SET, 5-2 then selects, as an operation clock signal, any one of three kinds of clock signals inputted through the ports T1 to T4 based on these bits of information and a preset clock selection priority order.

In other words, the SETS 5-2 functions as a selecting unit for selecting any one of a plurality of clock signals supplied from the SPI 11, the PPI 3 and the SETPI 4 for transmitting the transmission signal to the receiving side. The selected clock signal is outputted through a port T0. Bits of information regarding the SSMB of the clock signal and the NE through which the transmission signal is passed are outputted through the port S15 to the SEMF 6-2.

The specific names of the devices among which the transmission signal is relayed are cumulatively added as information used for distributing a clock signal. The SETS 5-2 is set so as to avoid selection of a clock signal previously passed through its own NE 1-2. In this way, the formation of a clock system closed loop can be prevented.

In other words, in the SETS 5-2, for selecting a clock signal, non-selection of a clock signal previously passed through its own NE 1-2 is set in the clock selection priority order based on the NE information added to the relay-received STM-N signal. Accordingly, whether a clock signal inputted to the SETS 5-2 has been passed through its own NE 1-2 or not can be monitored.

It can thus be understood that the SETS 5-2 functions as an inhibition setting unit for inhibiting the use of, as a clock signal contained in the transmission signal to be relay-transmitted, a clock signal contained in a transmission signal previously relay-transmitted by the SPI 11 based on the result of recognizing the information regarding the passed NE by the MST 2-2.

The SEMF 6-2 identifies, based on an SSMB from the SETS 5-2 and information regarding a relaying NE, the channel number of a transmission frame corresponding to the clock signal selected by the SETS 5-2. The SEMF 6-2 then adds the name of its own NE 1-2 (NE name or own station NE name) inputted through the port V from the MCF 7-2 to the foregoing information regarding the relaying NE. The SEMF 6-2 notifies the OHA 8-2 of information regarding an SSMB together with the renewed information regarding the relaying NE.

Thus, the SEMF 6-2 notifies, for each STM-1 signal, the OHA 8-1 through the port S13 of information regarding a relaying NE, which is recorded in the M1 #2 byte unit 205-2, and information regarding an SSMB, which is recorded in the S1 byte unit 201.

In other words, in the SEMF 6-2, the information regarding the clock signal selected by the SETS 5-2 is monitored, and the specific name of its own NE 102 is added to the information. This information is then outputted to the OHA 8-2.

The OHA 8-2 receives, from the SEMF 6-2, the information regarding the SSMB and the relaying NE for each STM-N signal through the port S13. The OHA 8-2 then accesses the MST 2-2 through the port U2 in order to multiplex the information received through the port S13 in the SOH of the transmission frame.

Thus, the SPI 11 as a relay-transmitting unit relay-transmits the transmission signal to the receiving side by using the clock signal selected by the SETS 5-2. The SPI 11 also functions as an identification information notifying unit for notifying the receiving side of identification information for identifying a clock supply system, which supplies the clock signal selected by the MST 2-2.

Figure 11:
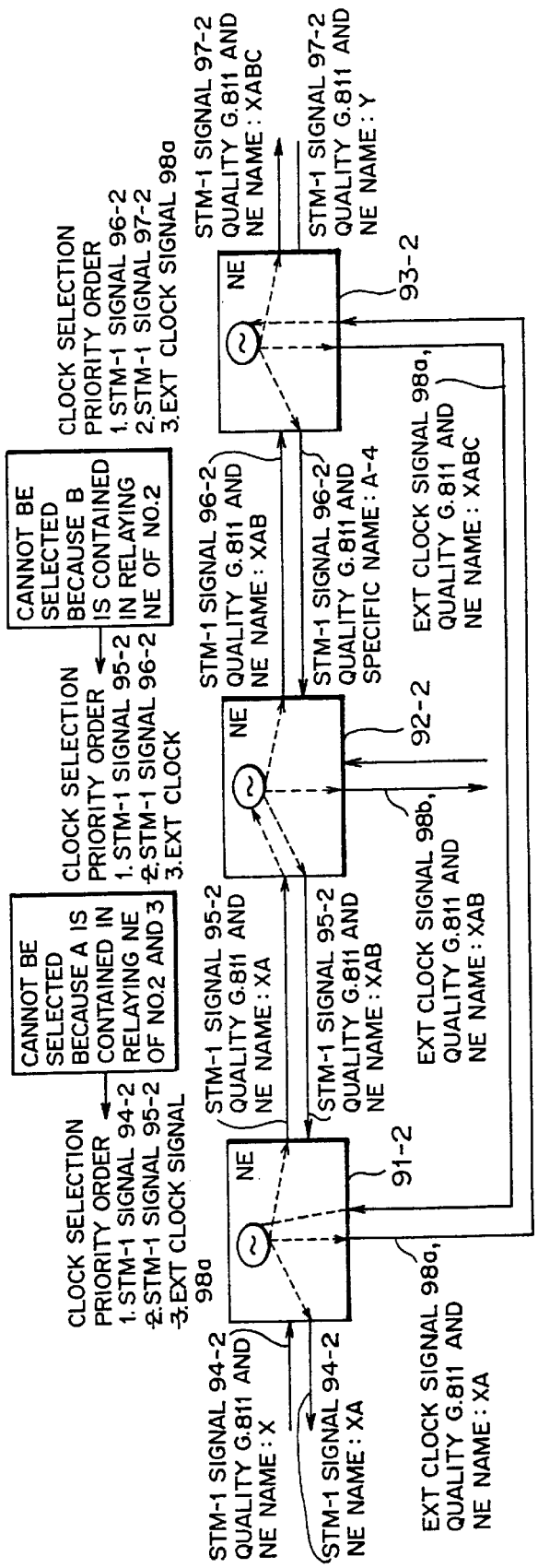
FIG. 11 is a block diagram illustrating an operation of an SDH network configured by including the network elements as transmission devices of the second embodiment.

The operation of the NE having the foregoing configuration of the second embodiment of the present invention will be described by referring to FIG. 11.

In an SDH network configured by including an NE (NE name; A) 91-2, an NE (NE name; B) 92-2 and an NE (NE name; C) 93-2 each having the same configuration as that of the NE 1-2 as the transmission device of the second embodiment, a closed loop is prevented from being formed as shown in FIG. 11.

More particularly, in the case of the NE 91-2, if an STM-1 signal 94-2 as a transmission signal (transmission signal relayed through one NE) is transferred with a not-shown NE, an STM-1 signal 95-2 is transferred with the NE 92-2. With the NE 93-2, an EXT CLOCK signal 98*a* is transferred via an external clock supply network 98. This EXT CLOCK signal 98*a* has a hierarchical transmission speed of, for instance 2 Mbps.

Similarly, in the case of the NE 92-2, in addition to the STM-1 signal 95-2 transferred with the NE 91-2, an STM-1 signal 96-2 is transferred with the NE 93-2. An EXT CLOCK signal 98*b* is transferred with the external clock supply network 98.

In the case of the NE 93-2, in addition to the STM-1 signal 96-2 transferred with the NE 92-2 and the EXT CLOCK signal 98*b* transferred with the NE 91-2 via the external clock supply network 98, an STM-1 signal 97-2 is transferred with a not-shown NE.

In the NE 91-2 to 93-2, for relay-transmitting the STM-1 signals 94-2 to 97-2 or the EXT CLOCK signals 98*a* and 98*b* to the other NE, among the STM-1 signals 94-2 to 97-2 or the EXT CLOCK signals 98*a* and 98*b* relay-received respectively by the NEs, an optimal clock signal is selected and used as a transmission clock signal.

Figure 10:
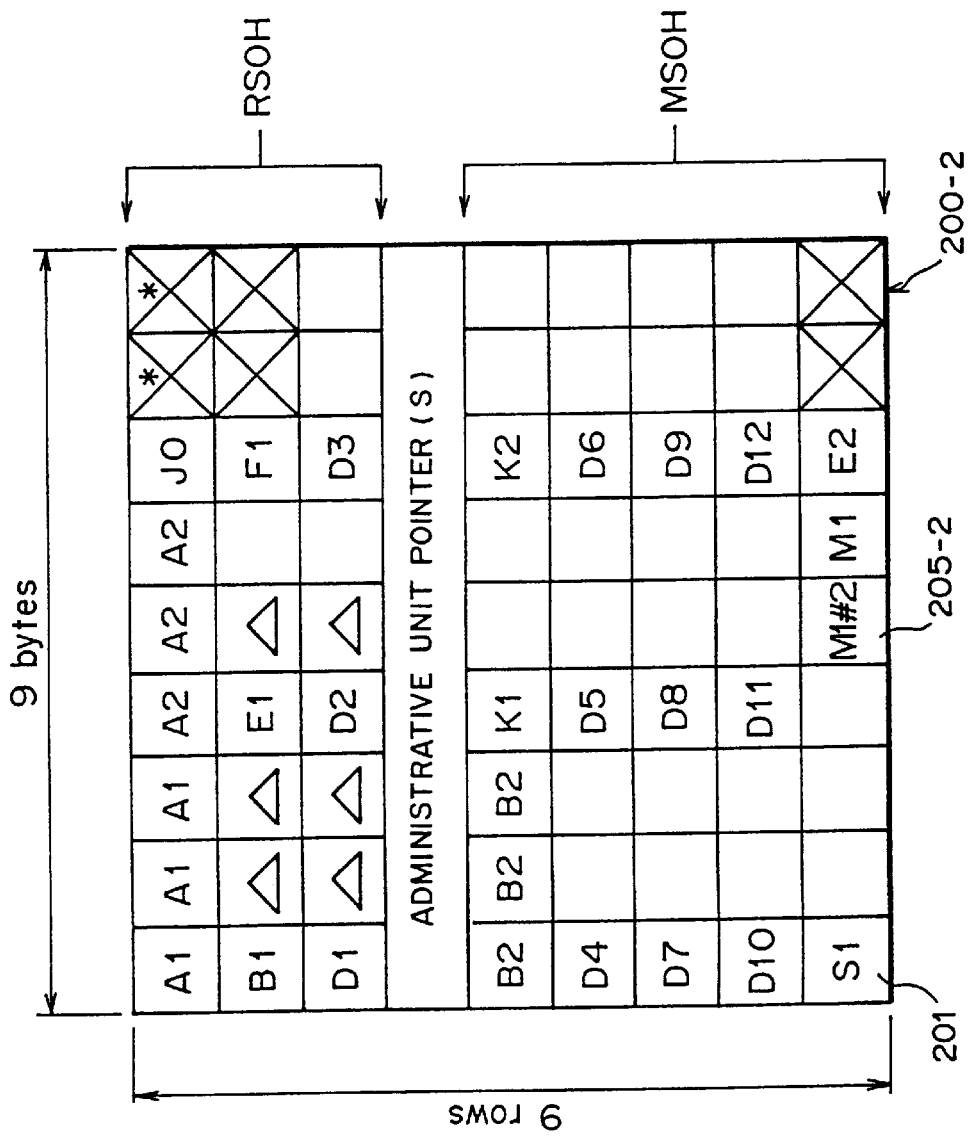
FIG. 10 is a view showing an SOH of an STM-1 signal transferred among the network elements of the second embodiment.

At this time, for the signal to be relay-transmitted, bits of information regarding the SSMB of the clock signal selected as the transmission clock signal and the relaying NE are multiplexed with an OHB signal (e.g., M1 #2 byte unit 205-2 of an SOH 200-2 shown in FIG. 10; for STM-1). Then, the signal is transmitted.

For example, in the NE 91-2, the clock signal of the STM-1 signal 94-2 received from the not-shown NE and the clock signal of the STM-1 signal 95-2 received from the NE 92-2 are respectively extracted by the SPI 11. The clock signal of the received EXT CLOCK signal 98*a* is extracted by the SETPI 4.

In the MST 2-2 of the NE 91-2, the bits of information regarding the SSMB and the relaying NE of the STM-1 signals 94-2 and 95-2 recorded in the SOH 200-2 are respectively extracted. The information regarding the SSMB of the EXT CLOCK signal 98*a* is also extracted by the SETPI.

In the SETS 5-2 of the NE 91-2, a. clock signal is selected to be used for the signal to be relay-transmitted. In this case, however, among the three kinds of clock signals extracted in the foregoing manner, a clock signal having best quality and a smallest relaying number is selected based on a preset clock selection priority order and bits of information regarding the SSMB and the relaying NE of each clock signal.

In the case of the NE 91-2, in the preset clock selection priority order, the clock signal of the STM-1 signal 94-2 is first (No. 1), the clock signal of the STM-1 signal 95-2 is second (No. 2) and the clock signal of the EXT clock signal 98*a* is third (No. 3).

In this case, the clock signal first in the priority order (clock signal of the STM-1 signal 94-2) is selected among the clock signals of the STM-1 signal 94-2, the STM-1 signal 95-2 and the EXT CLOCK signal 98*a* which are all extracted in the NE 91-2.

Specifically, if the relaying NE of the clock signal first in the priority order is "X", it means that the clock signal has been passed only through the NE named "X". On the other hand, the relaying NE of the clock signal second in the priority order is "XA". The relaying NE of the clock signal third in the priority order is "XABC". The clock signals second and third in the priority order have been inputted again after having been passed through the NE 91-2. Accordingly, these second and third clock signals are excluded from the choices, and only the clock signal first in the priority order is selected.

After the clock signal used for the transmission signal to be relay-transmitted has been selected in the SETS 5-2, in the SEMF 6-2, the name of its own NE is added to the information regarding the relaying NE. Then, by the OHA 8-2 and the MST 2-2, bits of information regarding the SSMB and the relaying NE of the selected clock signal are multiplexed with the same OHB as that of the relay-transmission frame and then transmitted through an STM-N port to the SOH of the transmission signal to be relay-transmitted.

After the clock signal has been selected in the SETS 5-2, in the SETPI 4, the selected clock signal is sent out as an external clock signal (EXT CLOCK signal 98*a* or 98*b*) through the synchronization interface port.

In the case of the clock disconnection of the STM-1 signal 94-2, if the clock signal first in the priority order is used for the clock signals second and third in the priority order, this clock signal is not selected. Instead, by temporarily using clock information stored in the NE 91-2, relay-transmission is continued.

Similarly, in the case of the NE 92-2, the relaying NE information of the clock signal first in the priority order (clock signal of the STM-1 signal 95-2) is "XA". The clock signal second in the priority order is "XAB". Accordingly, this second clock signal is excluded from the choices, and only the first clock signal highest in the priority order is selected.

In the NE 92-2, if a clock disconnection of the STM-1 signal 95-2 occurs, the clock signal second in the priority order is not selected. Instead, by using the clock signal of the EXT CLOCK signal 98*b* which is third in the priority order, relay-transmission is continued.

In the case of the NE 93-2, the relaying NE information of the clock signal first in the priority order (clock signal of the STM-1 signal 96-2) is "XAB". The relaying NE information of the clock signal second in the priority order is "XA". The relaying NE information of the clock signal third in the priority order is "XABC". Accordingly, in this case, the clock signals of any positions in the priority order are not excluded from the choices, and the first clock signal highest in the priority order is selected.

The network element as the transmission device of the second embodiment of the present invention is advantageous in the following respect.

The SETS 5-2 can inhibit selection of, as a clock signal contained in a transmission signal to be relay-transmitted, a clock signal contained in a transmission signal previously relay-transmitted by the SPI 11 of its own NE 1-2 from a plurality of clock signals supplied from the SPI 11, the PPI 3 and the SETPI 4 based on the result of information regarding a transmission history by the MST 202. Accordingly, a clock signal previously passed through the NE 1-2 can be prevented from being used for transmitting information to the other NE again. The formation of a clock system closed loop among three or more NEs can be prevented.

The information regarding the relaying history may be positioned on the MSOH, since it is inserted and separated at the same station as that of the SSMB information.

(C1) First Modified Example of the Second Embodiment

Figure 12:
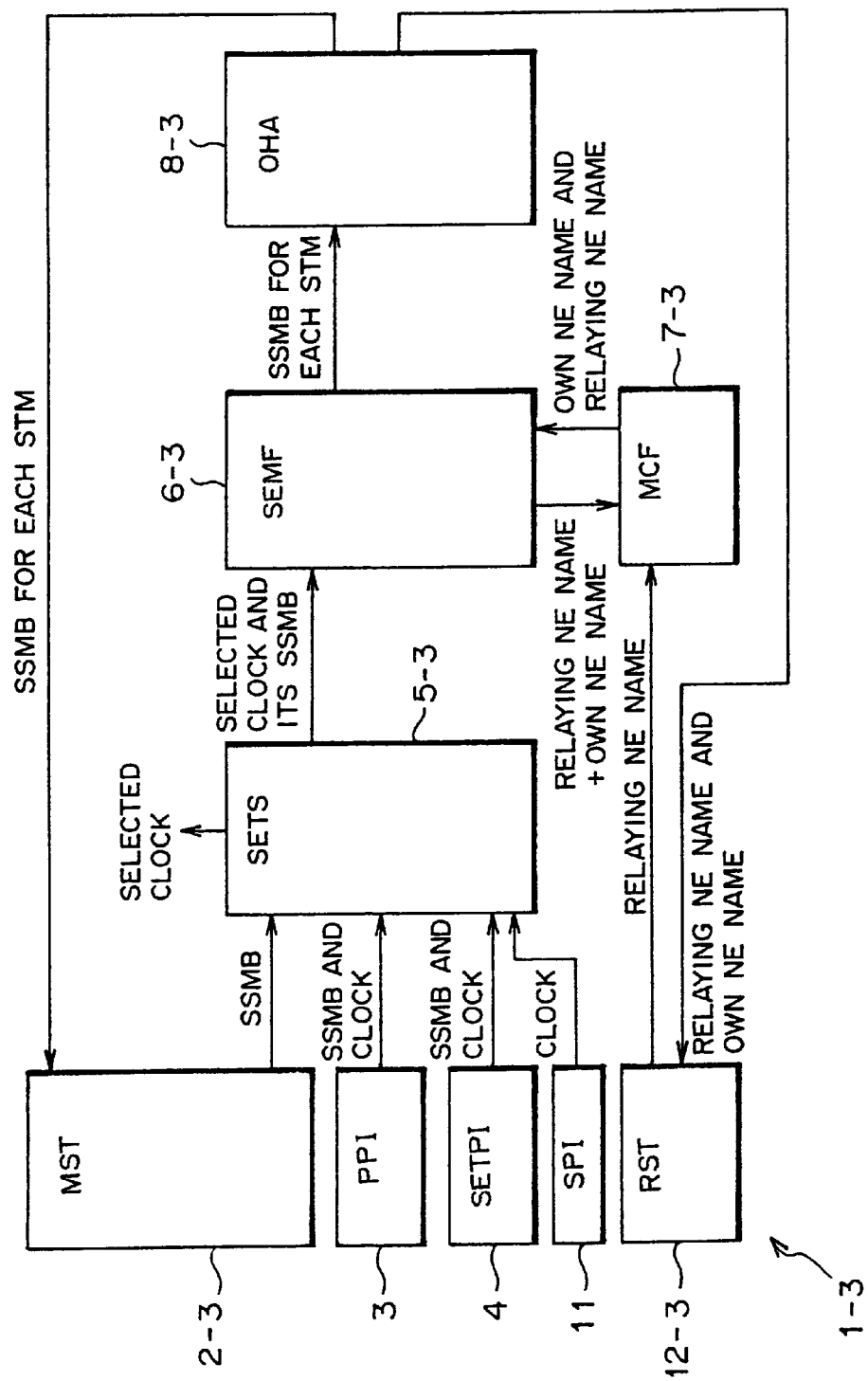
FIG. 12 is a block diagram showing main sections of a network element of a first modified example of the second embodiment.

Referring to FIG. 12 which is a block diagram, there are shown main sections of an NE as the transmission device of the first modified example of the second embodiment of the present invention. For its details, an NE 1-3 shown in FIG. 12 is basically configured by including the same function units as those of the NE shown in FIG. 3.

Figure 13:
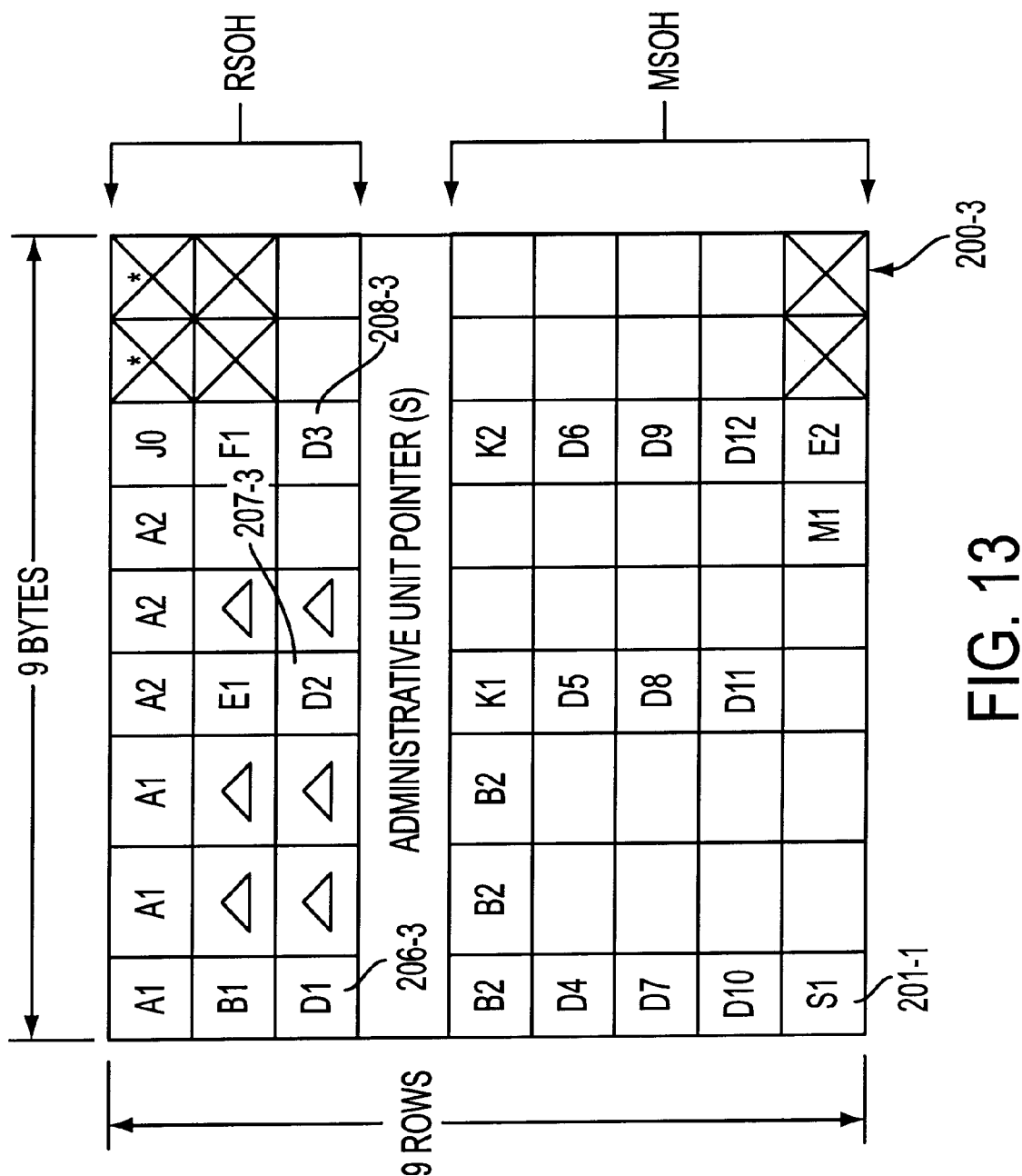
FIG. 13 is a view showing an SOH of an STM-1 signal transferred among the network elements of the first modified example of the second embodiment.

The NE 1-3 shown in FIG. 12 is different from the NE of the second embodiment in that relaying NE information is recorded not in the unused byte unit of the MSOH but, as shown in FIG. 13, in a M1 #2 byte unit 205-3 as a data communication channel (DCC) (for an STM-1 signal).

Different from the NE of the second embodiment (see the reference numeral 1), the NE 13 includes an MST 2-3, a n SETS 5-3, an SEMF 6-3, an MCF 7-3, an OHA 8-3 and an RST 12-3. Other units are basically the same as those of the NE of the second embodiment.

More particularly, a relay-transmitted STM-N signal is inputted through the SPI 11 of the TTF 10 to the RST 12-3. The RST 12-3 extracts information regarding a relaying NE as the relaying history of the STM-N signal from an M1 #2 byte unit 205-3 and notifies the MCF 7-3 of its extracting result through a port N.

The MST 2-3 extracts an SSMB recorded as clock quality information in the S1 byte unit 201 from the STM-N signal (N; a natural number) supplied from the RST 12-3. The MST 2-3 then notifies the SETS 5-3 of its extracting result through the port Y1.

The MCF 7-3 outputs the relaying NE information of the STM-N signal extracted by the RST 12-3 through the port V to the SEMF 6-3. The SEMF 6-3 outputs the relaying NE information supplied from the MCF 7-3 through the port S15 to the SETS 5-3.

An SSMB from each of the MST 2-3, the PPI 3 and the SETPI 4 and the relaying NE information from the SEMF 6-3 are inputted to the SETS 5-3. As in the case of the SETS 5-2 of the second embodiment, the SETS 5-3 selects, as an operation clock signal, any one of the three kinds of clock signals inputted through the ports T1 to T4 based on the foregoing information and a preset clock selection priority order.

The SEMF 6-3 identifies the channel of the transmission frame of the selected clock signal, and notifies the OHA 8-3 of relaying NE information and an SSMB for each STM-1 signal.

In the SEMF 6-3, the NE name of its own NE 13 (own station NE name) notified by the MCF 7-3 is added to the relaying NE information supplied from the SETS 5-3. Accordingly, the renewed relaying NE information is notified to the OHA 8-3.

The OHA 8-3 accesses the RST 12-3 through the port U1 in order to set the relaying NE information from the SEMF 6-3 in the M1 #2 byte unit 205-3 of an SOH 200-3. The OHA 8-3 also accesses the MST 2-3 through the port U2 in order to set the SSMB in the S1 byte unit 201 of the SOH 200-3.

Accordingly, the MST 2-3 can set the SSMB of the selected signal in the S1 byte unit 201-3 of the SOH 200-3 for the STM-1 signal for relay-transmission. The RST 12-3 can set the relaying NE information in the M1 #2 byte unit 205-3 of the SOH 200-3.

Thus, by configuring an SDH network so as to include three NEs 91-3 to 93-3 each having the same configuration as that of the NE 1-3 as the transmission device of the first modified example of the second embodiment of the present invention, as in the case of the NE of the second embodiment, a closed loop can be prevented from being formed (see FIG. 6).

The NE of the first modified example of the second embodiment of the present invention is advantageous in the following respect.

As in the case of the NE of the second embodiment, by preventing the use of a clock signal previously passed through the NE 1-3 for transmitting information to the other NE again, the formation of a clock system closed loop among three or more NEs can be prevented.

(C2) Second Modified Example of the Second Embodiment

Figure 14:
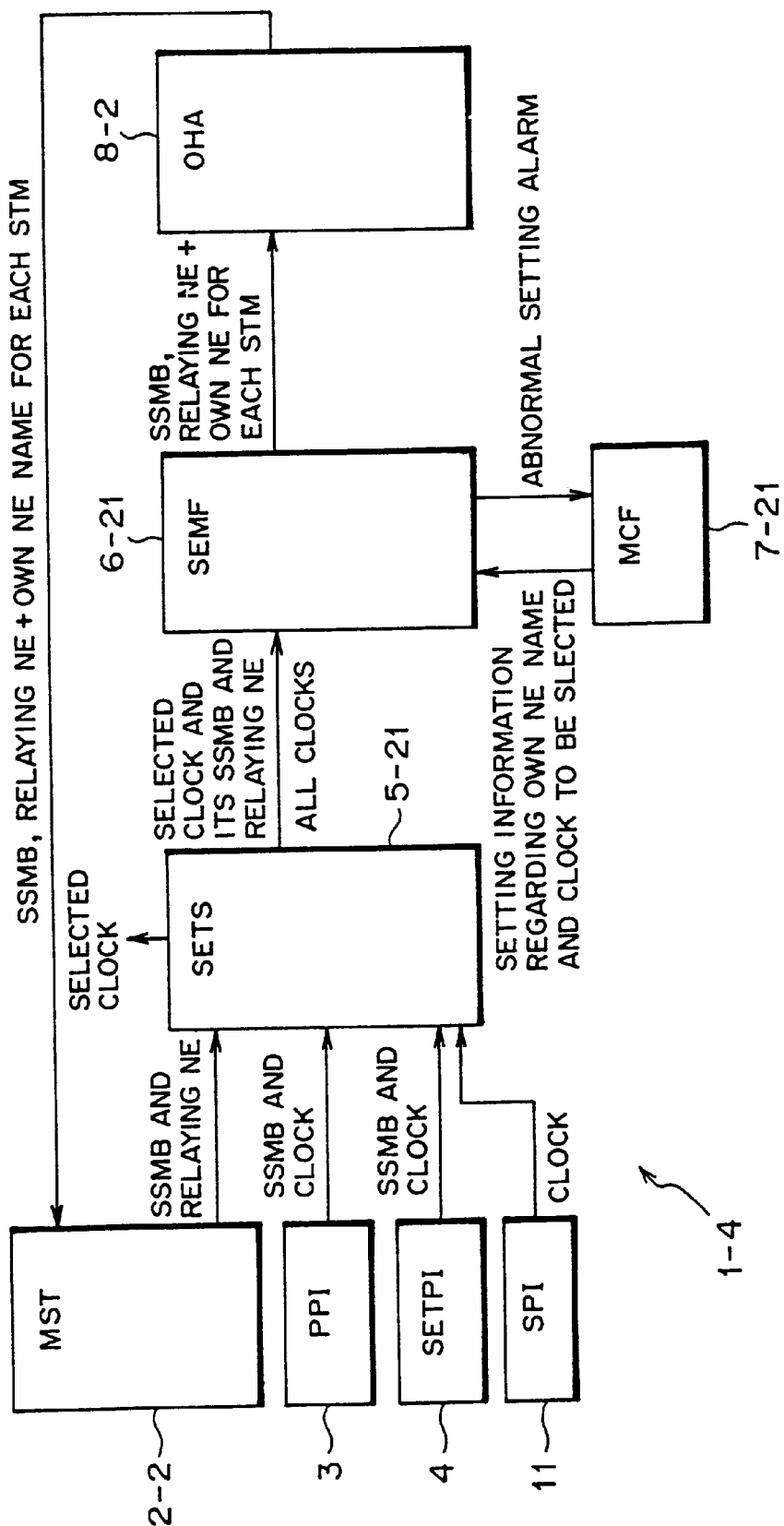
FIG. 14 is a block diagram showing main sections of a network element of a second modified example of the second embodiment.

Referring to FIG. 14 which is a block diagram, there are shown main sections of the network element of the second modified example of the second embodiment. An NE 1-4 shown in FIG. 14 is different from the NE (see the reference numeral 12) of the second embodiment in that among the clock signals set for selection in the selection priority order and managed by the SETS 5-2, if any clock signals previously passed through the NE 1-2 are contained therein, an alarm is issued.

Different from the NE (see the reference numeral 1-2) of the second embodiment, as shown in FIG. 14, the NE 1-4 of the second modified example of the second embodiment includes an SETS 5-21, an SEMF 6-21 and an MCF 7-21. Other units are basically the same as those of the NE of the second embodiment, and thus detailed description will be omitted.

As in the case of the SETS 5-2 of the second embodiment, the SETS 5-21 selects a clock signal based on bits of information regarding an SSMB and a relaying NE supplied from the MST 2-2 and information regarding a selection priority order preset in the NE 1-4. The SETS 5-21 also outputs relaying NE information for all transmission signals inputted as STM-N signals through the port S15 to the SEMF 6-21.

The MCF 7-21 can manage information regarding clock signals set for selection in the priority order preset in the NE 1-4. The MCF 7-21 notifies the SEMF 6-21 of this setting information together with the name of its own NE 1-4.

The SEMF 6-21 includes the same functions as those of the SEMF (reference numeral 6-2) of the second embodiment. The SEMF 6-21 also determines whether or not the clock signals selected by the SETS 5-21 have been set including, among the clock signals set for selection in the priority order, clock signals previously passed through the NE 1-4 of its own.

In other words, from the SETS 5-21, the relaying NE information of all the transmission signals inputted as STM-N signals are inputted to the SEMF 6-21. From the MCF 7-21, the information regarding the clock signals set for selection in the clock signal selection priority order is also inputted to the SEMF 6-21. Then, by collating these bits of information with each other, the SEMF 6-21 can determine whether or not setting has been made including the clock signals previously passed through the NE 1-4 of its own.

If the inclusion of the clock signals previously passed through the NE 1-4 in the setting is determined, an alarm is issued to the MCF 7-21 so as to inform the existence of abnormal setting. Accordingly, by notifying the maintenance engineer of the abnormal setting of the clock signals for selection, the setting can be changed.

The second modified example of the second embodiment of the present invention is advantageous in the following respect.

As in the case of the second embodiment, by preventing clocks previously passed through the NE 1-4 from being used for transmitting information to the other NE again, the formation of a clock system closed loop among three or more NEs can be prevented. In addition, if there is abnormal setting for clock signals to be selected, since this abnormal setting is notified to the maintenance engineer so as to change the setting, the maintenance function of the network can be improved.

(D) Others

The preferred embodiments of the present invention have been described in detail in connection with the use of the NE in the SDH network. However, the invention is not limited to the foregoing embodiments, and the NE can be used for the networks other than the SDH network, in which the other devices of the network are operated in synchronization with a clock signal produced by a certain device.

What is claimed is:

1. A transmission device employing a network synchronization system for relay-transmitting a transmission signal from a transmitting side to a receiving side in synchronization with a clock signal, said transmission device comprising:

a clock extracting unit for extracting a plurality of clock signals from a plurality of received signals;

a selecting unit for selecting any one of said plurality of clock signals supplied from said clock extracting unit for transmitting Paid transmission signal to said receiving side;

a relay-transmitting unit for relay-transmitting said transmission signal to said receiving side by using said clock signal selected by said selecting unit;

an identification information notifying unit for notifying said receiving side of identification information used for identifying a clock supply system for supplying said clock signal selected by said selecting unit;

a relay-receiving unit for relay-receiving said transmission signal from said transmitting side;

an identification information extracting and recognizing unit for extracting and recognizing identification information regarding a clock signal contained in said transmission signal relay-received by said relay-receiving unit; and an inhibition setting unit for inhibition setting said selecting unit to select, as a clock signal contained in said transmission signal to be relay-transmitted, a clock signal contained in a transmission signal previously relay-transmitted by said relay-transmitting unit based on a result of recognizing identification information by said identification information extracting and recognizing unit.

2. A transmission device as claimed in claim 1, wherein said identification information to be notified by said identification information notifying unit or identification information extracted and recognized by said identification information extracting and recognizing unit includes information for identifying a clock signal generation source for producing a clock signal and information regarding a relaying number, among transmission devices, of said transmission signal transmitted by said clock signal produced by said clock signal generation source.

3. A transmission device as claimed in claim 1, wherein said identification information to be notified by said identification information notifying unit or identification information extracted and recognized by said identification information extracting and recognizing unit includes information regarding a relaying history of said transmission signal among transmission devices.

4. A transmission device as claimed in claim 1, wherein said identification information notifying unit notifies said receiving side of said identification information by adding the same to said transmission signal transmitted to said receiving side, and said identification information extracting and recognizing unit extracts and recognizes identification information from said transmission signal to be relay-transmitted from said transmitting side to said receiving side.

5. A transmission device as claimed in claim 1, wherein said identification information is notified through a data communication channel to said receiving side, and said identification information extracting and recognizing unit receives and recognizes, through said data communication channel, identification information contained in said transmission signal relay-transmitted from said transmitting side to said receiving side.

6. A signal transmission method in a synchronous network for relay-transmitting a transmission signal through a plurality of transmission devices in synchronization with a clock signal, said signal transmission method comprising, when a transmission signal is relay-transmitted from a first transmission device, the steps of:

receiving a plurality of transmission signals for relay-transmission;

extracting a plurality of clock signals from said plurality of received transmission signals;

relay-transmitting said transmission signal to a transmission device as a transmission destination by using any one of said plurality of clock signals extracted in said clock signal extracting step; and notifying said transmission destination of identification information regarding said clock signal used for said relay-transmission performed in said relay-transmitting step.

7. A signal transmission method in a synchronous network as claimed in claim 6, wherein in said relay-transmitting step, among said plurality of clock signals extracted in clock signal extracting step, a clock signal contained in said transmission signal relay-transmitted from said first transmission device is inhibited from being used for performing said relay-transmission.

* * * * *